United States Patent
Kikkawa

(10) Patent No.: US 10,834,166 B2
(45) Date of Patent: Nov. 10, 2020

(54) TRANSMISSION APPARATUS THAT IS CAPABLE OF MAINTAINING TRANSMISSION QUALITY IN SWITCHING TRANSMISSION PATH, RECEPTION APPARATUS, TRANSMISSION AND RECEPTION SYSTEM, METHOD OF CONTROLLING TRANSMISSION APPARATUS AND RECEPTION APPARATUS, AND STORAGE MEDIUM

(71) Applicant: CANON KABUSHIKI KAISHA, Tokyo (JP)

(72) Inventor: Teruki Kikkawa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 99 days.

(21) Appl. No.: 16/039,373

(22) Filed: Jul. 19, 2018

(65) Prior Publication Data
US 2019/0044992 A1 Feb. 7, 2019

(30) Foreign Application Priority Data
Aug. 2, 2017 (JP) ................................ 2017-149961

(51) Int. Cl.
| | |
|---|---|
| *H04L 29/06* | (2006.01) |
| *H04N 7/08* | (2006.01) |
| *H04N 7/01* | (2006.01) |
| *H04N 21/262* | (2011.01) |

(Continued)

(52) U.S. Cl.
CPC .......... *H04L 65/607* (2013.01); *H04L 65/605* (2013.01); *H04L 65/608* (2013.01);
(Continued)

(58) Field of Classification Search
CPC . H04L 65/607; H04L 65/1083; H04L 65/602; H04L 47/25; H04L 69/04;
(Continued)

(56) References Cited

U.S. PATENT DOCUMENTS

2006/0123456 A1* 6/2006 Dei ....................... H04N 7/162
725/146
2006/0224763 A1* 10/2006 Altunbasak .......... H04W 88/06
709/231

(Continued)

FOREIGN PATENT DOCUMENTS

JP 2006270824 A 10/2006
JP 2013017106 A 1/2013

*Primary Examiner* — Jungwon Chang
(74) *Attorney, Agent, or Firm* — Rossi, Kimms & McDowell LLP

(57) ABSTRACT

A transmission apparatus capable of ensuring transmission quality when switching one of duplicated video data items transmitted using different transmission paths, to the other thereof, for display. Encoding sections A and B perform first and second encoding processing for generating first and second data based on video data, respectively, so as to transmit the first and second data to a reception apparatus via first and second transmission paths, respectively. Information on a skew between the first and second data received by the reception apparatus via the first and second transmission paths is acquired, for controlling at least one of the encoding sections A and B based on the skew information such that the skew is reduced.

12 Claims, 15 Drawing Sheets

(51) Int. Cl.
*H04N 21/6402* (2011.01)
*H04N 21/61* (2011.01)

(52) U.S. Cl.
CPC ........... *H04L 65/80* (2013.01); *H04N 7/0127* (2013.01); *H04N 7/08* (2013.01); *H04N 21/262* (2013.01); *H04N 21/6402* (2013.01); *H04N 21/6125* (2013.01)

(58) Field of Classification Search
CPC ....... H04L 63/18; H04L 41/20; H04L 65/608; H04L 65/80; H04L 65/605; H04N 7/0127; H04N 7/162; H04N 19/423; H04N 7/08; H04N 21/262; H04N 21/6402; H04N 21/6125
See application file for complete search history.

(56) References Cited

U.S. PATENT DOCUMENTS

| | | | |
|---|---|---|---|
| 2011/0208833 A1* | 8/2011 | Fallon | H04N 9/8042 709/217 |
| 2012/0117225 A1* | 5/2012 | Kordasiewicz | H04L 65/1083 709/224 |
| 2012/0250762 A1* | 10/2012 | Kaye | H04L 47/25 375/240.07 |
| 2014/0074911 A1* | 3/2014 | Park | H04L 65/602 709/203 |
| 2014/0247890 A1* | 9/2014 | Yamaguchi | H04N 19/172 375/240.29 |
| 2017/0048532 A1* | 2/2017 | Sadhwani | H04N 19/423 |

* cited by examiner

| | PD SPECIFICATION VALUE | RATE CONTROL THRESHOLD VALUE PL |
|---|---|---|
| 501 — SBR STREAM | NOT LARGER THAN 450 [ms] | 360 [ms] |
| 502 — HBR STREAM | NOT LARGER THAN 150 [ms] | 110 [ms] |

FIG. 12A

| VIDEO FORMAT (W × H) | ENCODING RATE | |
|---|---|---|
| | INITIAL VALUE | MAXIMUM VALUE |
| 4096 × 2160 | 10 | 20 |
| 1920 × 1080 | 20 | 45 |
| 1280 × 960 | 30 | 70 |

FIG. 12B

| VIDEO FORMAT (W × H) | MOTION AMOUNT | PRIORITY | FRAME RATE | BIT DEPTH |
|---|---|---|---|---|
| 4096 × 2160 | LARGE | 1 | 120p | 12 BITS |
| | | 2 | 60p | 10 BITS |
| | | 3 | 60i | 8 BITS |
| | | 4 | 30p | |
| | | 5 | 24p | |
| | SMALL | 1 | 120p | 12 BITS |
| | | 2 | 60p | 10 BITS |
| | | 3 | 30p | 8 BITS |
| | | 4 | 24p | |
| | | 5 | 60i | |

FIG. 13

| VIDEO FORMAT (W × H) | IMAGE QUALITY THRESHOLD VALUE |
|---|---|
| 4096 × 2160 | 1.8 |
| 1920 × 1080 | 2.0 |
| 1280 × 960 | 2.2 |

FIG. 16
RELATED ART
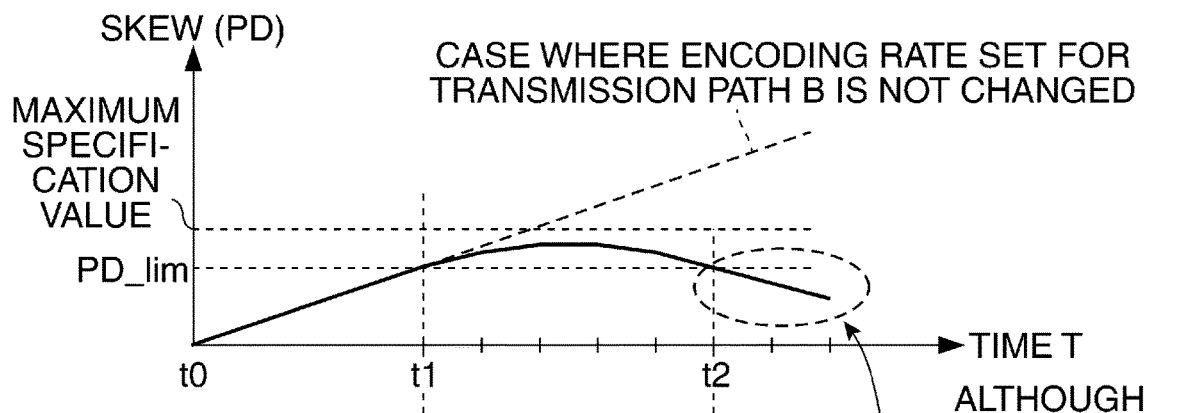
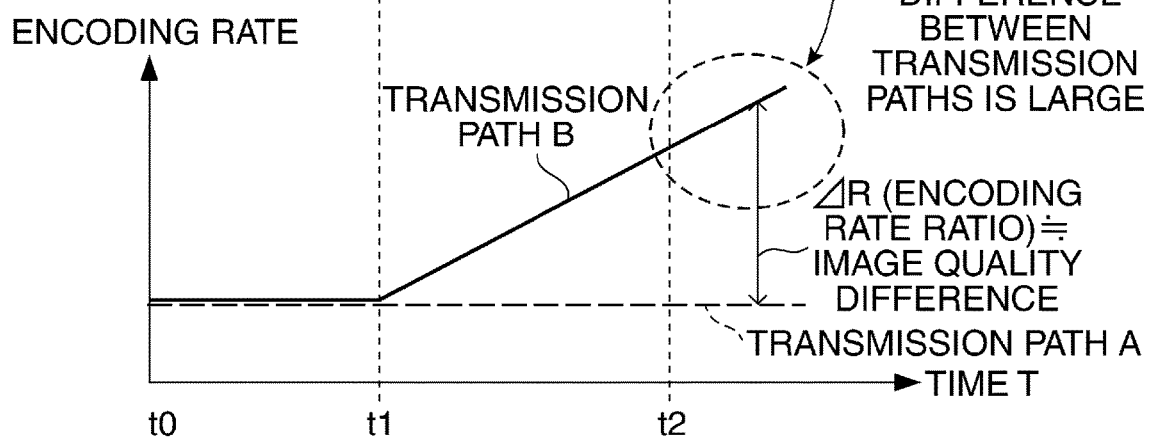

TRANSMISSION APPARATUS THAT IS CAPABLE OF MAINTAINING TRANSMISSION QUALITY IN SWITCHING TRANSMISSION PATH, RECEPTION APPARATUS, TRANSMISSION AND RECEPTION SYSTEM, METHOD OF CONTROLLING TRANSMISSION APPARATUS AND RECEPTION APPARATUS, AND STORAGE MEDIUM

BACKGROUND OF THE INVENTION

Field of the Invention

The present invention relates to a transmission apparatus, a reception apparatus, a transmission and reception system, a method of controlling the transmission apparatus and the reception apparatus, and a storage medium, and more particularly to a transmission apparatus that transmits encoded video signals using duplicate transmission paths, a reception apparatus, a transmission and reception system, and a method of controlling the transmission apparatus and the reception apparatus.

Description of the Related Art

An SDI (serial digital interface) cable is currently used for transmitting a video from broadcast and production equipment. Conventionally, transmission of a video has been performed by using one SDI cable, but there has been proposed a method of transmitting a video by using a bundle of a plurality of SDI cables, in accordance with improvement of image quality of a video shot by an image pickup apparatus. For example, when transmitting 4K/60P images, the images can be transmitted by binding four SDI cables. However, since four times as many as conventional cables are used to connect between equipment, there arise problems of space for installation and the weight of SDI cables. Further, since a larger number of SDI cables are required as the image quality of a video shot by an image pickup apparatus is made even higher, the above-mentioned problems become serious.

To solve these problems, there has been recently developed a video transmission and reception system that uses IP network transmission for transmitting video signals of photographed images using a network, such as the Internet, on a real-time basis. By using IP network transmission, it is possible to transmit a video at higher speed than video transmission using the SDI cable, and further, when distributing the video, differently from a case where broadcast and production equipment for professional use is used, the video can be distributed using a general-purpose equipment, and hence it is possible to construct an environment in which high-speed video transmission can be performed at low costs. For this reason, it is expected that broadcast and production equipment will rapidly become IP-based in the future.

In the IP network transmission of the video transmission and reception system, there is employed a method of transmitting digitized video data as baseband (non-compressed) signals or as encoded signals. As an encoding method, there is used, for example, MPEG-2 (Moving Picture Experts Group phase 2) which is an international standard. Further, as a protocol for transmitting video data and audio data requiring real-time property, an RTP (Real-time Transport Protocol) is used. In RTP transmission, an apparatus that transmits a video adds a sequence number of a packet and a time stamp to the header part of the packet, whereby an apparatus that receives the video is capable of reproducing video images in a proper order. Further, by using RTCP (Real-time Transport Control Protocol), it is possible to bidirectionally communicate information for performing RTP flow control between a video transmitting apparatus and a video receiving apparatus. This makes it possible to notify the video transmitting apparatus of packet loss and transmission delay information, which are detected by the video receiving apparatus.

In RTP transmission, UDP (User Datagram Protocol) is generally used as a transport layer protocol without control for retransmission of video data, and hence a transmission path is monitored for a congestion state by RTCP, and the transfer bit rate is controlled.

The IP network transmission of video data, described above, has been discussed aiming to international standardization, and is compiled as the SMPTE (Society of Motion Picture & Television Engineers) 2022 standard. The SMPTE 2022-7 standard describes, as "Seamless Protection Switching", a method in which video data packets are redundantly transmitted over duplicate transmission paths, and even when one of the duplicate transmission paths is down, data transmission is performed by instantaneously switching to the other transmission path which is normal. Further, to continuously transmit video signals without interruption, the SMPTE 2022-7 standard defines receiver classes associated with skew values between the duplicate transmission paths, and time periods as the skew values. For example, a moderate skew in high bit rate video transmission is defined as class B and 50 [ms] or less.

Incidentally, to transmit video data packets and audio data packets via different transmission paths and seamlessly switch the transmission path on a video receiving apparatus side, it is important that corresponding packets via the two transmission paths arrive with such a simultaneity that a skew between them is accommodated within the above-mentioned range. However, in the different transmission paths, different network devices, such as routers and switchers, are connected. Further, the frequency of communication packets sent from the video transmitting apparatus is also different between the two transmission paths. This brings about a problem that it is impossible to maintain simultaneity of the video data packet and the audio data packet, between the video transmitting apparatus and the video receiving apparatus.

As solutions to this problem, there have been proposed techniques described below.

A technique discussed first is as follows: In a configuration for receiving a signal containing video data and audio data and outputting a video signal and an audio signal, a video delay amount and an audio delay amount are determined based on a video synchronization signal taken out from the video data and an audio synchronization signal taken out from the audio data, respectively. Then, by adding a delay amount of display of the video occurring in a video display section to the audio delay amount, the video signal and the audio signal are controlled to be output at the same timing (see e.g. Japanese Laid-Open Patent Publication (Kokai) No. 2013-17106).

Another technique discussed next is as follows: In a configuration capable of simultaneously receiving an analog video signal and a digital video signal, which correspond to each other, first, a time difference between a time at which an analog video signal is output for reproduction after receiving the same and a time at which a digital video signal is output for reproduction after receiving the same is detected as a delay time, and then the timing in which the digital video signal is output for reproduction is controlled to be delayed by the detected delay time (see Japanese Laid-Open Patent Publication (Kokai) No. 2006-270824).

In the techniques described in Japanese Laid-Open Patent Publication (Kokai) No. 2013-17106 and Japanese Laid-Open Patent Publication (Kokai) No. 2006-270824, a delay amount is added to one of a video signal and an audio signal associated therewith, or one of video signals associated with each other, which is transmitted from the video transmitting apparatus to the video receiving apparatus and of which data arrives at the video receiving apparatus earlier than the other, whereby the simultaneity of the one signal with the other signal which arrives later is maintained. That is, in Japanese Laid-Open Patent Publication (Kokai) No. 2013-17106 and Japanese Laid-Open Patent Publication (Kokai) No. 2006-270824, data is buffered at the video receiving apparatus for a certain time period to thereby accommodate fluctuations of the arrival time.

As the data buffering time period is made longer, larger fluctuations of the packet arrival time can be accommodated. However, this increases the delay time before the video receiving apparatus reproduces the video data for display, which brings about the problem of spoiling real-time property of video.

Further, if the transfer bit rate is independently controlled in each transmission path according to the congestion state of the transmission path as conventionally performed, it is impossible to satisfy the condition of an allowable skew tolerance between the two transmission paths, defined by the SMPTE standard. This causes a problem that the reception buffer of the video receiving apparatus is placed in an unexpected state, such as underflow, making it impossible to perform smooth switching of the transmission path.

SUMMARY OF THE INVENTION

The preset invention provides a transmission apparatus, a reception apparatus, a transmission and reception system, a method of controlling the transmission apparatus and the reception apparatus, and a storage medium, which make it possible to ensure transmission quality when switching one of duplicated video data items which are transmitted using different transmission paths, to the other thereof, for display.

In a first aspect of the present invention, there is provided a transmission apparatus comprising a first encoding unit configured to perform first encoding processing for generating first data based on video data, a second encoding unit configured to perform second encoding processing for generating second data based on the video data, a first transmission unit configured to transmit the first data to a reception apparatus via a first transmission path, a second transmission unit configured to transmit the second data to the reception apparatus via a second transmission path, an acquisition unit configured to acquire skew information associated with a difference between a time at which data of the first data, corresponding to a first frame, is received by the reception apparatus, and a time at which data of the second data, corresponding to the first frame, is received by the reception apparatus, and a control unit configured to control at least one of the first encoding unit and the second encoding unit, based on the skew information, such that a difference between a time at which data of the first data, corresponding to a second frame after the first frame, is received by the reception apparatus, and a time at which data of the second data, corresponding to the second frame, is received by the reception apparatus, is not larger than a predetermined value.

Even in a case where the same video is transmitted using two transmission paths, if the transfer bit rate is independently operated in each transmission path so as to satisfy the condition of the allowable skew tolerance between the two transmission paths, a difference in image quality is caused between the data items transmitted via the two transmission paths, depending on a bit rate operation method.

FIG. 16 is a diagram useful in explaining a relationship between an encoding rate (data compression rate) and a skew in a case where the transfer bit rate is controlled using the encoding rate.

FIG. 16 shows a state in which the throughput of the transmission path B is lower than that of the transmission path A, and for example, in a case where the transmission paths A and B are equal in the encoding rate (from time t0 to time t1), the skew between the two transmission paths shows an increasing tendency. A time at which the skew reaches a threshold value PD_lim where the skew control between the two transmission paths is to be started is represented by t1, and as the encoding rate of the transmission path B is gradually increased from the time t1, the skew between the two transmission paths is reduced in accordance with the increase of the encoding rate. However, at time t2, a difference in image quality is caused between the data items transmitted via the transmission paths A and B by an amount corresponding to a difference in the encoding rate.

That is, assuming that during the display of data received via the transmission path A by the video receiving apparatus, the data for display is switched due to a link down of the transmission path A from the data received via the transmission path A to data received via the transmission path B in the normal state, there occurs a problem that a viewer feels strangeness or may have difficulty in continuing to view the displayed video due to the difference in image quality between the data items received respectively via the two transmission paths. Further, depending on a degree of the image quality difference, the user may erroneously recognize that the link of the transmission path B, which is in the normal state, has also gone down.

To solve the above-described problem, preferably, the control unit controls one of an encoding rate, a frame rate, and a bit depth of the video data in the first encoding processing, and an encoding rate, a frame rate, and a bit depth of the video data in the second encoding processing, based on the skew information, such that the difference between the time at which the data of the first data, corresponding to the second frame, is received by the reception apparatus, and the time at which the data of the second data, corresponding to the second frame, is received by the reception apparatus, is not larger than the predetermined value.

In a second aspect of the present invention, there is provided a reception apparatus comprising a first reception unit configured to receive first data generated based on video data from a transmission apparatus via a first transmission path, a second reception unit configured to receive second data generated based on the video data from the transmission apparatus via a second transmission path, an acquisition unit configured to acquire skew information associated with a difference between a time at which data of the first data, corresponding to a first frame, is received by the reception apparatus, and a time at which data of the second data, corresponding to the first frame, is received by the reception apparatus, and an output unit configured to output the skew information to the transmission apparatus.

In a third aspect of the present invention, there is provided a transmission and reception system that transmits and receives data via a first transmission path and a second transmission path, including a transmission apparatus and a reception apparatus, the transmission apparatus comprising a first encoding unit configured to perform first encoding processing for generating first data based on video data, a second encoding unit configured to perform second encoding processing for generating second data based on the video data, a first transmission unit configured to transmit the first data to the reception apparatus via the first transmission path, a second transmission unit configured to transmit the second data to the reception apparatus via the second transmission path, a first acquisition unit configured to acquire skew information associated with a difference between a time at which data of the first data, corresponding to a first frame, is received by the reception apparatus, and a time at which data of the second data, corresponding to the first frame, is received by the reception apparatus, and a control unit configured to control at least one of the first encoding unit and the second encoding unit, based on the skew information, such that a difference between a time at which data of the first data, corresponding to a second frame after the first frame, is received by the reception apparatus, and a time at which data of the second data, corresponding to the second frame, is received by the reception apparatus, is reduced, and the reception apparatus comprising a first reception unit configured to receive the first data from the transmission apparatus via the first transmission path, a second reception unit configured to receive the second data from the transmission apparatus via the second transmission path, a second acquisition unit configured to acquire the skew information associated with the difference between the time at which the data of the first data, corresponding to the first frame, is received by the reception apparatus, and the time at which the data of the second data, corresponding to the first frame, is received by the reception apparatus, and an output unit configured to output the skew information to the transmission apparatus.

In a fourth aspect of the present invention, there is provided a method of controlling a transmission apparatus, comprising performing first encoding processing for generating first data based on video data, performing second encoding processing for generating second data based on the video data, transmitting the first data to a reception apparatus via a first transmission path, transmitting the second data to the reception apparatus via a second transmission path, acquiring skew information associated with a difference between a time at which data of the first data, corresponding to a first frame, is received by the reception apparatus, and a time at which data of the second data, corresponding to the first frame, is received by the reception apparatus, and controlling at least one of the first encoding processing and the second encoding processing, based on the skew information, such that a difference between a time at which data of the first data, corresponding to a second frame after the first frame, is received by the reception apparatus, and a time at which data of the second data, corresponding to the second frame, is received by the reception apparatus, is reduced.

In a fifth aspect of the present invention, there is provided a method of controlling a reception apparatus, comprising receiving first data generated based on video data from a transmission apparatus via a first transmission path, receiving second data generated based on the video data from the transmission apparatus via a second transmission path, acquiring skew information associated with a difference between a time at which data of the first data, corresponding to a first frame, is received by the reception apparatus, and a time at which data of the second data, corresponding to the first frame, is received by the reception apparatus, and outputting the skew information to the transmission apparatus.

In a sixth aspect of the present invention, there is provided a non-transitory computer-readable storage medium storing a computer-executable program for executing a method of controlling a transmission apparatus, wherein the method comprises performing first encoding processing for generating first data based on video data, performing second encoding processing for generating second data based on the video data, transmitting the first data to a reception apparatus via a first transmission path, transmitting the second data to the reception apparatus via a second transmission path, acquiring skew information associated with a difference between a time at which data of the first data, corresponding to a first frame, is received by the reception apparatus, and a time at which data of the second data, corresponding to the first frame, is received by the reception apparatus, and controlling at least one of the first encoding processing and the second encoding processing, based on the skew information, such that a difference between a time at which data of the first data, corresponding to a second frame after the first frame, is received by the reception apparatus, and a time at which data of the second data, corresponding to the second frame, is received by the reception apparatus, is reduced.

In a seventh aspect of the present invention, there is provided a non-transitory computer-readable storage medium storing a computer-executable program for executing a method of controlling a reception apparatus, wherein the method comprises receiving first data generated based on video data from a transmission apparatus via a first transmission path, receiving second data generated based on the video data from the transmission apparatus via a second transmission path, acquiring skew information associated with a difference between a time at which data of the first data, corresponding to a first frame, is received by the reception apparatus, and a time at which data of the second data, corresponding to the first frame, is received by the reception apparatus, and outputting the skew information to the transmission apparatus.

According to the present invention, it is possible to ensure transmission quality, when switching one of duplicated video data items transmitted using different transmission paths to the other of the same, for display.

Further features of the present invention will become apparent from the following description of exemplary embodiments (with reference to the attached drawings).

BRIEF DESCRIPTION OF THE DRAWINGS

FIGS. 12A and 12B are diagrams useful in explaining encoding parameter tables held by an encoding parameter management section of the transmission device according to the third embodiment.

FIG. 13 is a diagram useful in explaining a determination threshold value table held by an image quality-monitoring section of the transmission device according to the third embodiment.

FIG. 16 is a diagram useful in explaining a relationship between an encoding rate and a skew in a case where a transfer bit rate is controlled using the encoding rate.

DESCRIPTION OF THE EMBODIMENTS

The present invention will now be described in detail below with reference to the accompanying drawings showing embodiments thereof. However, the scope of the present invention is not limited to the functions, relative dispositions, and so forth, of components described in the embodiments, unless otherwise specifically described. Further, first descriptions of the function, shape, and so forth, given of each of constructions and components, apply to the corresponding constructions and components, referred to thereafter, unless otherwise described anew.

Figure 1:
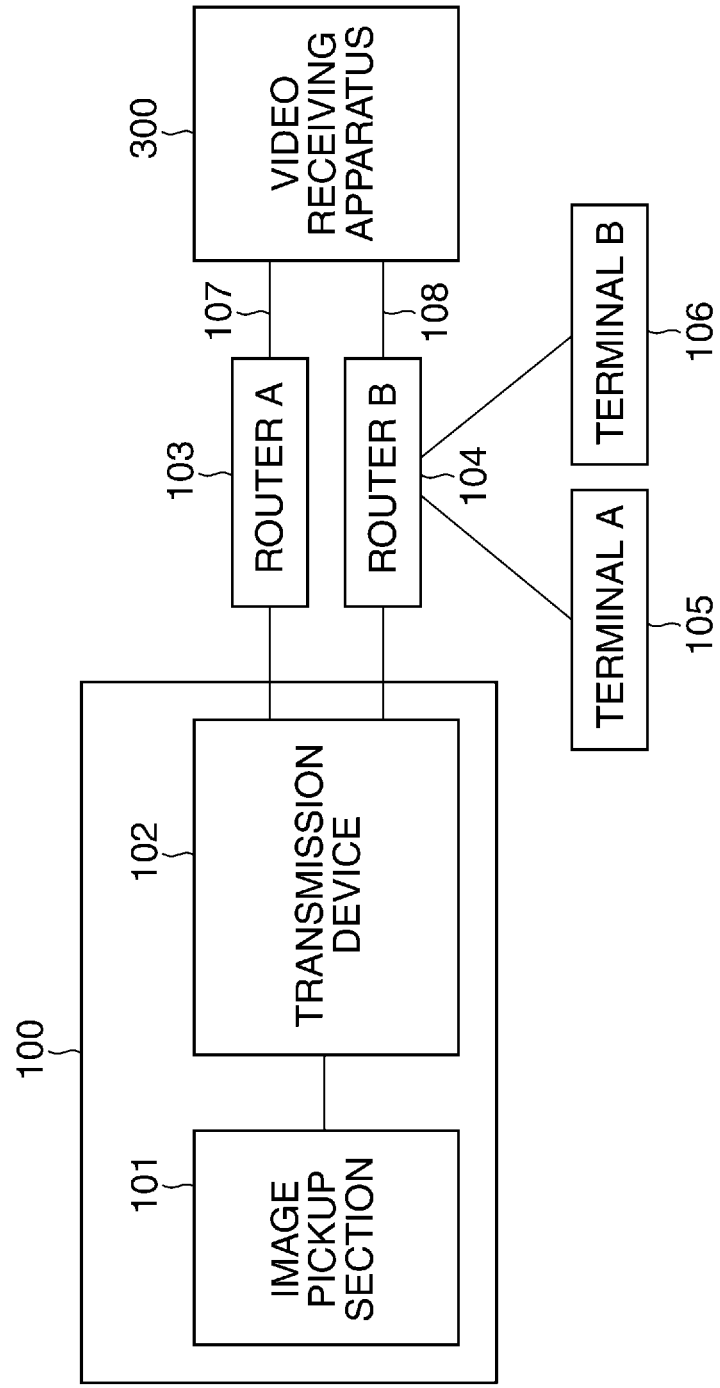
FIG. 1 is a schematic diagram of a video transmission and reception system according to a first embodiment of the invention.

FIG. 1 is a schematic diagram of a video transmission and reception system according to a first embodiment of the invention.

Referring to FIG. 1, the video transmission and reception system is comprised of a video transmitting apparatus 100 including an image pickup section 101 and a transmission device 102, and a video receiving apparatus 300. Further, a router A 103 and a router B 104 are disposed between the video transmitting apparatus 100 and the video receiving apparatus 300, and are connected to the video transmitting apparatus 100 and the video receiving apparatus 300 via respective independent transmission paths. Although in FIG. 1, two terminals A 105 and B 106 are connected to the router B 104, three or more terminals may be connected to one router. The terminal A 105 and the terminal B 106 are implemented by any of desktop PCs, laptop PCs, and controllers, such as a controller of the video transmitting apparatus 100 and a controller of the video receiving apparatus 300.

In the video transmitting apparatus 100, the transmission device 102 encodes video data photographed e.g. by the image pickup section 101 and transmits the encoded video data to the video receiving apparatus 300 via transmission paths. In the present embodiment, the video transmitting apparatus 100 transmits the data of the same photographed video to the video receiving apparatus 300 redundantly over the two transmission paths A and B, denoted by 107 and 108, respectively.

The video receiving apparatus 300 is configured to receive video data delivered from the video transmitting apparatus 100, and display the received video data. The video receiving apparatus 300 receives data of the same video via the transmission path A 107 and the transmission path B 108. Therefore, even when one of the transmission paths in use goes down, making it impossible to receive video data via the same, it is possible to quickly switch the video data for display to video data received from the other transmission path. Note that the video receiving apparatus 300 is not limited to an apparatus having a display function, but may be an apparatus including a storage device, which is configured to receive and accumulate video data delivered from the video transmitting apparatus 100.

Figure 2:
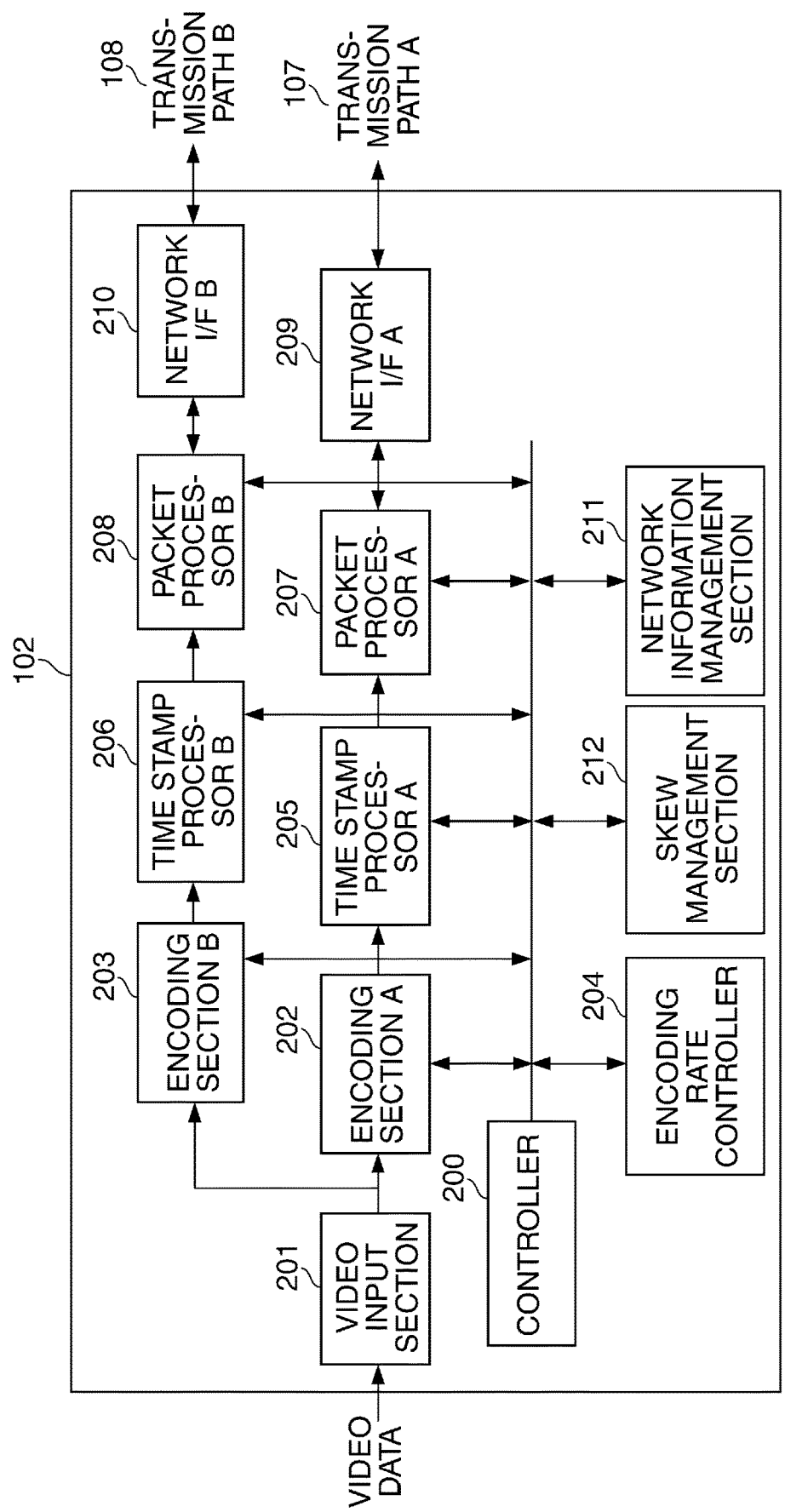
FIG. 2 is a functional block diagram of a transmission device of a video transmitting apparatus according to the first embodiment.

FIG. 2 is a functional block diagram of the transmission device 102 of the video transmitting apparatus 100 according to the present embodiment.

Referring to FIG. 2, a ROM and a RAM, neither of which is shown, are connected to a controller 200, and the controller 200 controls the overall operation of the transmission device 102 according to programs stored in the ROM. The RAM is a volatile memory, which is used as a work memory for the controller 200, and is also used as an area for temporarily storing various data. A video input section 201 receives video data output from the image pickup section 101, implemented by a camera or the like, and distributes the received video data to an encoding section A 202 and an encoding section B 203, each of which performs coding of video data and compressing of the coded data.

The encoding section A 202 and the encoding section B 203 each perform encoding (coding & compression) processing for converting received video data to encoded data, based on an encoding rate set by an encoding rate controller 204. Note that in the present specification, the term "encoding rate" is used with the same meaning as the term "data compression ratio". Therefore, as the encoding rate is higher, the size of data is more reduced.

A time stamp processor A 205 and a time stamp processor B 206 add time stamps to the encoded data items input from the encoding section A 202 and the encoding section B 203, respectively. The time stamp processor A 205 and the time stamp processor B 206 perform processing such that the same time stamp is added to the data items of the same video which are input from the encoding section A 202 and the encoding section B 203.

The time stamp refers to an RTP time stamp which is defined by IETF (Internet Engineering Task Force) RFC7272, for example. In this case, the time stamp is added to each packet, described hereinafter, and the same value is added on a frame basis. That is, the time stamp processors A 205 and B 206 add the same time stamp to each identical frame of video data items of the same scene, which are input from the respective encoding sections A 202 and B 203.

Although the following description is given assuming that the same time stamp is added to the same frame, this is not limitative, but for example, a time stamp may be added on a line basis. In this case, the time stamp processors A 205 and B 206 add the same time stamp to each identical line of video data items of the same scene, which are input from the respective encoding sections A 202 and B 203.

A packet processor A 207 and a packet processor B 208 each convert encoded data including a time stamp to a transmission packet, and transmit the packets to an external apparatus via a network interface A 209 and a network interface B 210, respectively.

Further, the packet processor A 207 and the packet processor B 208 also perform processing for decoding packet data received from the network interface A 209 and the network interface B 210 to reception data, and output the reception data (decoded data) to a network information management section 211.

The network information management section 211 analyzes the reception data received via the network interface A 209 or the network interface B 210, and acquires a skew between the transmission path A 107 and the transmission path B 108, detected by the video receiving apparatus 300.

A skew management section 212 stores proper skew values set in accordance with the video format and so forth of the video transmitting apparatus 100 in the form of a table (described hereinafter with reference to FIG. 5) in advance. The skew management section 212 requests the encoding rate controller 204 to increase or reduce the encoding rate according to a skew value acquired from the network information management section 211, using this table.

The encoding rate controller 204 sets an encoding rate for each of the encoding section A 202 and the encoding section B 203 in response to an encoding rate-changing request from the skew management section 212. Note that the encoding rate controller 204 can set different encoding rates for the encoding section A 202 and the encoding section B 203, respectively.

Figure 3:
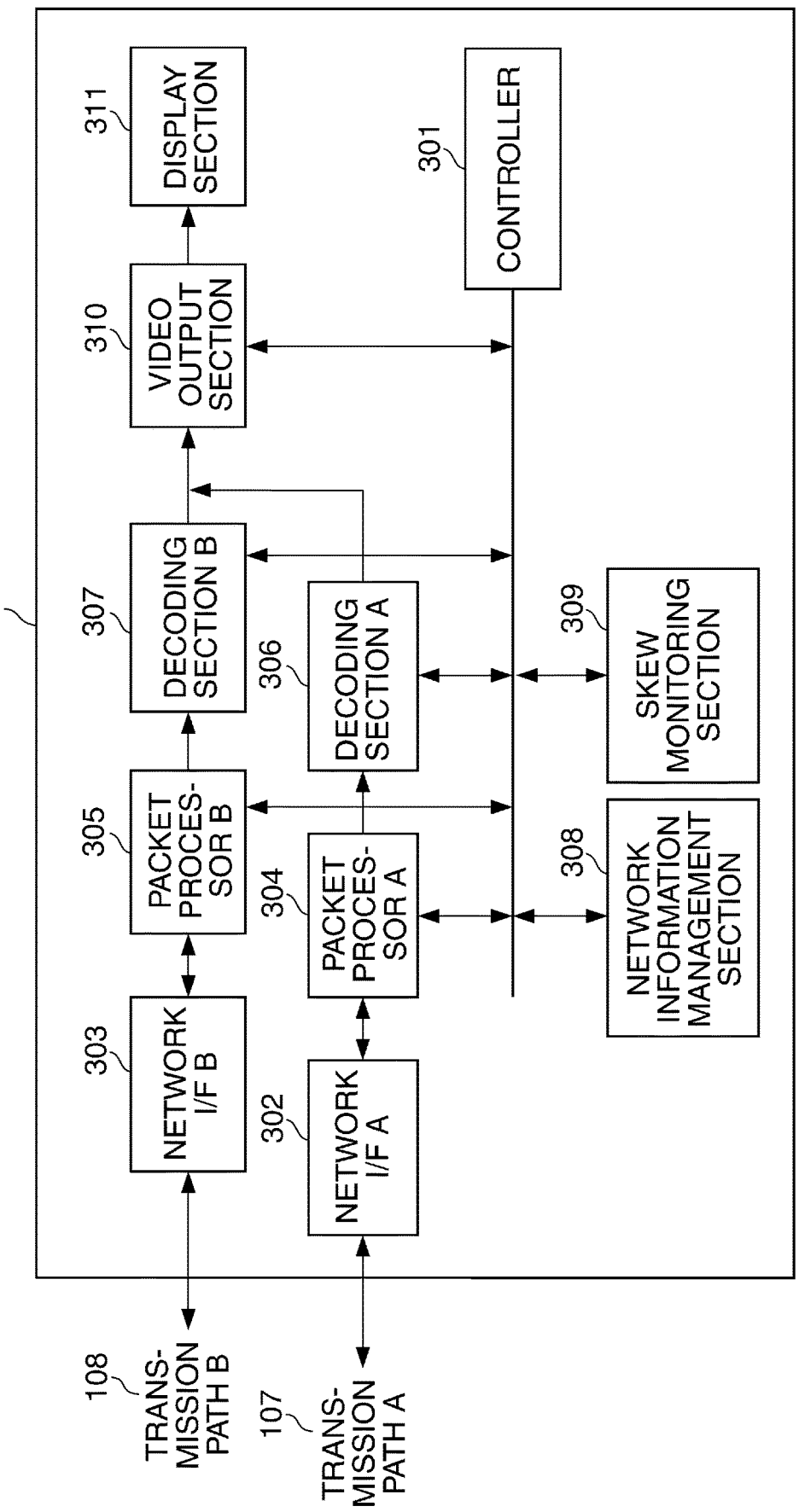
FIG. 3 is a functional block diagram of a video receiving apparatus according to the first embodiment.

FIG. 3 is a functional block diagram of the video receiving apparatus 300 according to the present embodiment.

Referring to FIG. 3, a ROM and a RAM, neither of which is shown, are connected to a controller 301 of the video receiving apparatus 300, and the controller 301 controls the overall operation of the video receiving apparatus 300 according to programs stored in the ROM. The RAM is a volatile memory, which is used as a work memory for the controller 301, and is also used as an area for temporarily storing various data.

The video receiving apparatus 300 includes a network interface A 302 which communicates with the video transmitting apparatus 100 via the transmission path A 107 and a network interface B 303 which communicates with the video transmitting apparatus 100 via the transmission path B 108. Further, the video receiving apparatus 300 includes a packet processor A 304 and a packet processor B 305 each of which decodes a received packet to reception data, and a decoding section A 306 and a decoding section B 307 each of which decodes the reception data to video data.

The packet processor A 304 and the packet processor B 305 each further output the decoded reception data to a network information management section 308.

A skew monitoring section 309 acquires respective time stamp information items added to frames of the same content of video data received via the transmission path A 107 and the transmission path B108, from the network information management section 308. Then, the skew monitoring section 309 calculates a reception time difference based on the acquired time stamp information as a skew between the transmission path A 107 and the transmission path B108.

The skew monitoring section 309 outputs the calculated time difference to the network information management section 308.

When the time difference is input from the skew monitoring section 309, the network information management section 308 controls the packet processor A 304 and the packet processor B 305 to generate a transmission packet including the information of the received time difference. Then, the network information management section 308 transmits the transmission packet to the video transmitting apparatus 100 via the network interface A 302 or the network interface B 303.

A video output section 310 selects and receives video data input from the decoding section A 306 or the decoding section B 307, and outputs the received video data to a display section 311.

The display section 311 is a display device implemented by an LCD (Liquid Crystal Display), an OLED (Organic Electro-Luminescence Display), or the like.

Figures 4, 5:
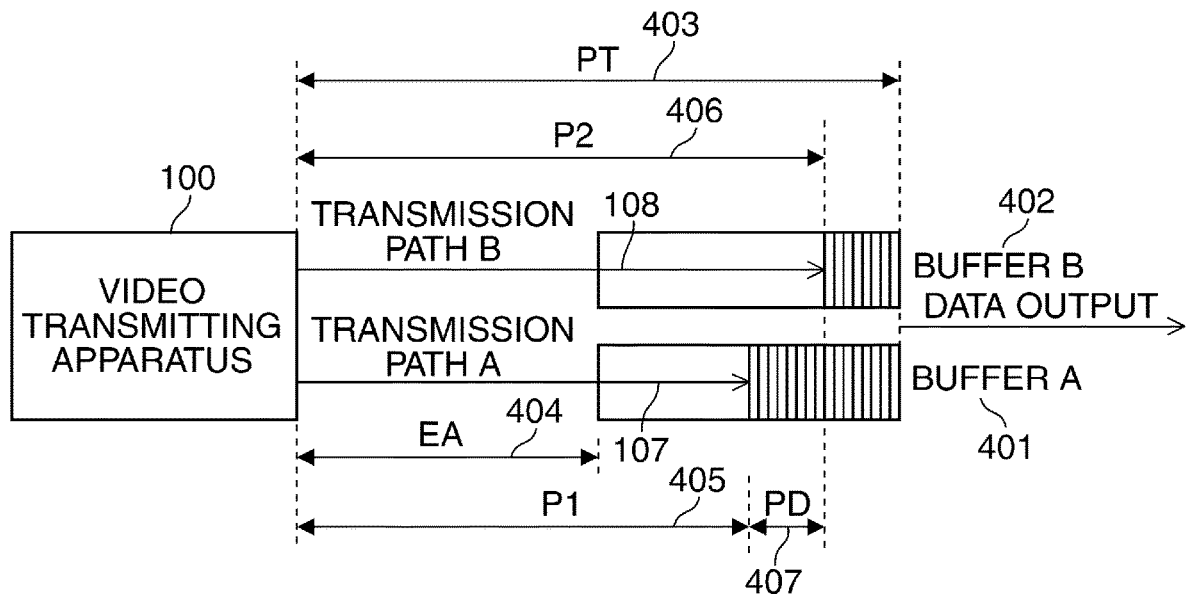
FIG. 4 is a schematic diagram useful in explaining a skew in the first embodiment.
FIG. 5 is a diagram useful in explaining a management table held by a skew management section of the transmission device according to the first embodiment.

FIG. 4 is a schematic diagram useful in explaining a skew in the present embodiment.

A buffer A 401 and a buffer B 402, appearing in FIG. 4, are buffer areas included in the packet processor A 304 and the packet processor B 305 of the video receiving apparatus 300, respectively. The buffer A 401 is a storage area for accumulating reception packets received via the transmission path A 107 and the network interface A 302 as reception data. On the other hand, the buffer B 402 is a storage area for accumulating reception packets received via the transmission path B 108 and the network interface B 303 as reception data. Note that the buffer A 401 and the buffer B 402 may be included not in the packet processor A 304 and the packet processor B 305, but in the decoding section A 306 and the decoding section B 307 as components configured to accumulate decoded data.

Referring to FIG. 4, PT denoted by reference numeral 403 indicates a latency caused in a case where transmission data delivered from the video transmitting apparatus 100 arrives at the video receiving apparatus 300 latest. EA denoted by reference numeral 404 indicates a latency caused in a case where transmission data delivered from the video transmitting apparatus 100 arrives at the video receiving apparatus 300 earliest. P1 denoted by reference numeral 405 and P2 denoted by reference numeral 406 each indicate a latency caused at an arbitrary time at which transmission data delivered from the video transmitting apparatus 100 arrives at the video receiving apparatus 300. PD denoted by reference numeral 407 indicates a difference value between the latency P1 (405 in FIG. 4) and the latency P2 (406 in FIG. 4), and this difference value indicates a skew between the transmission path A 107 and the transmission path B 108.

FIG. 5 is a diagram useful in explaining the management table held by the skew management section 212 of the transmission device 102 according to the present embodiment. This management table holds information on proper skews each set according to the bit rate of a video signal delivered from the video transmitting apparatus 100.

More specifically, the management table shown in FIG. 5 defines a PD (skew) specification value 503 and a rate control threshold value PL 504 for each of SBR (Slower Bit Rate) stream 501 and HBR (High Bit Rate) stream 502.

For example, in the case of an SBR video signal (e.g. in SD-SDI signal format) having an bit rate not higher than 270 Mbps, the PD specification value is defined to be not larger than 450 [ms], and the rate control threshold value PL is defined to be 360 [ms]. Further, in the case of an HBR video signal (e.g. in HD-SDI or 3G-SDI signal format) having a bit rate of 1.485 Gbps or 2.97 Gbps, the PD specification value is defined to be not larger than 150 [ms] and the rate control threshold value PL is defined to be 110 [ms].

When the skew becomes not smaller than the rate control threshold value PL, the video transmitting apparatus 100 delivers video data by controlling the encoding rate according to a video data output process, described hereinafter, such that the skew is within a range of the PD specification value.

Figure 6:
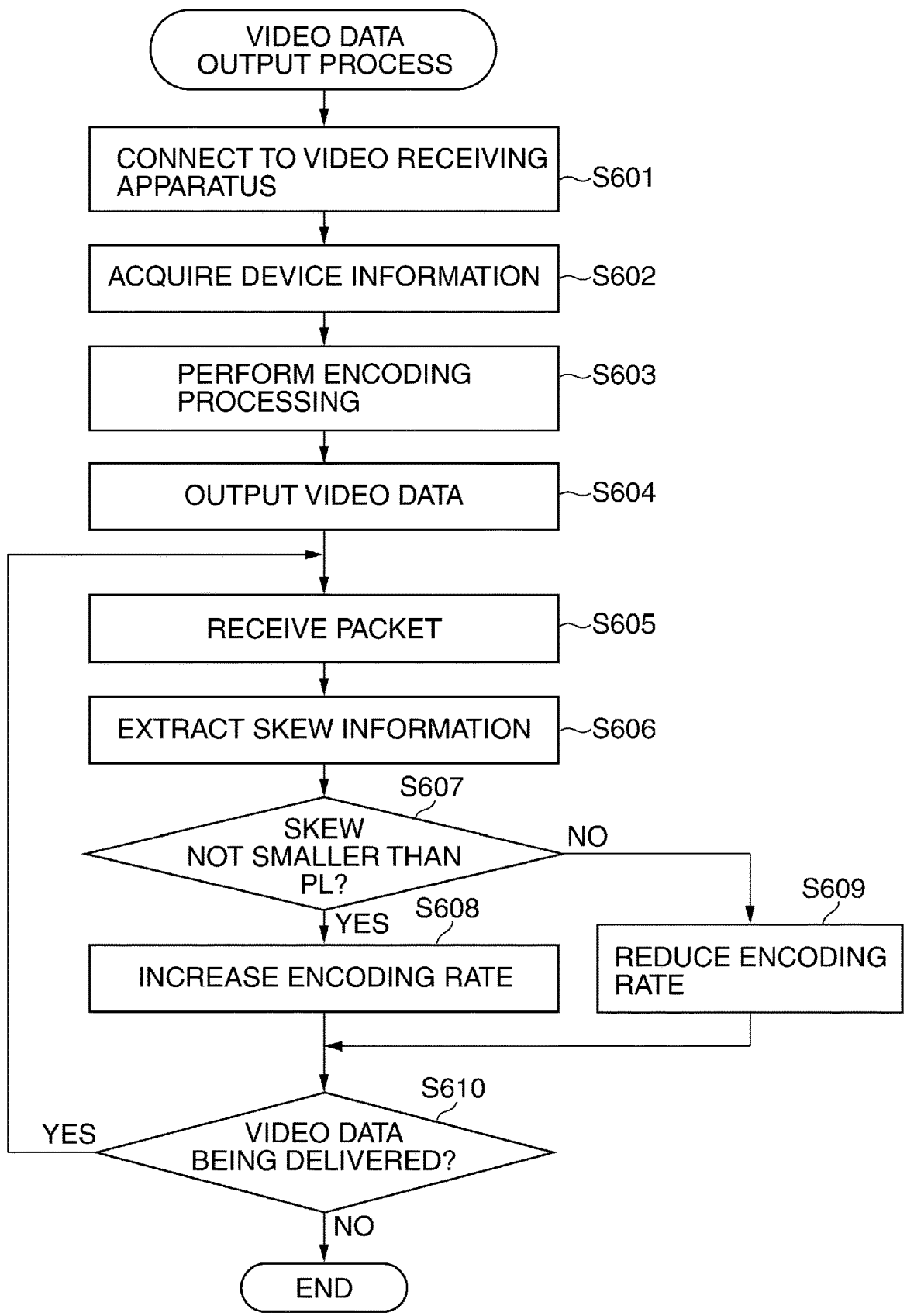
FIG. 6 is a flowchart of a video data output process performed by the video transmitting apparatus according to the first embodiment.

FIG. 6 is a flowchart of the video data output process performed by the video transmitting apparatus 100 according to the present embodiment.

Referring to FIG. 6, first, the video transmitting apparatus 100 is connected to the video receiving apparatus 300 via a network (step S601).

Next, the video transmitting apparatus 100 acquires device information from the video receiving apparatus 300, and also transmits device information of the self-apparatus to the video receiving apparatus 300 (step S602). Note that in the present embodiment, video data is transmitted using the RTP protocol, and when transmitting and receiving information between the connected apparatuses, a communication control protocol, such as RTCP, is used, for example.

Next, in a step S603, the encoding section A 202 and the encoding section B 203 perform encoding processing on video data input from the video input section 201 at a predetermined encoding rate, which is set in advance as an initial value.

In a step S604, the packet processor A 207 packetizes the video data input from the encoding section A 202 via the time stamp processor A 205, and then the packetized video data is delivered via the network interface A 209 as transmission packets. Similarly, the packet processor B 208 packetizes the video data input from the encoding section B 203 via the time stamp processor B 206, and then the packetized video data is delivered via the network interface B 210 as transmission packets. Note that a content ID is added to each transmission packet delivered in the step S604 as head information. This enables the video receiving apparatus 300 to determine whether or not the video data items received via the transmission path A 107 and the transmission path B 108, respectively, are of the same contents. Although in the present embodiment, the content ID is added to each transmission packet, this is not limitative, but any other information may be used insofar as it enables the video receiving apparatus 300 to determine whether or not the video data items received via the transmission path A 107 and the transmission path B 108 are of the same contents.

In a state in which the video data is being delivered, in a step S605, upon receipt of a packet from the video receiving apparatus 300, the packet processor A 207 or the packet processor B 208 decodes the received packet to reception data, and outputs the decoded reception data to the network information management section 211. The received packet includes skew information formed into a transmission packet by processing in a step S804, described hereinafter.

In a step S606, the network information management section 211 extracts the skew information from the reception data input from the packet processor A 207 or the packet processor B 208, and outputs the extracted skew information to the skew management section 212.

Next, in a step S607, the skew management section 212 compares the skew information input from the network information management section 211 with the rate control threshold value PL 504 in the management table, shown in FIG. 5. Then, the skew management section 212 requests the encoding rate controller 204 to control the encoding rate based on a result of the comparison. More specifically, if the skew is not smaller than the rate control threshold value PL 504 (YES to the step S607), the skew management section 212 requests the encoding rate controller 204 to increase the encoding rate set for the encoding section associated with the transmission path which is later in reception time. On the other hand, if the skew is smaller than the rate control threshold value PL 504 (NO to the step S607), the skew management section 212 requests the encoding rate controller 204 to reduce the encoding rate set for the encoding section associated with the transmission path which is later in reception time.

Although in the present embodiment, to simplify the explanation, each one rate control threshold value PL 504 is set for the SBR video signal and the HBR video signal, this is not limitative. For example, by setting threshold values to be applied when increasing the encoding rate and when reducing the encoding rate, respectively, the encoding rate may be controlled with hysteresis, whereby it is possible to more moderately control the encoding rate.

The encoding rate controller 204 performs encoding processing by changing the encoding rate set for the encoding section A 202 or the encoding section B 203 in response to the request from the skew management section 212 (steps S608 or S609). Then, if the video data is being delivered by the controller 200 of the video transmitting apparatus 100 (YES to a step S610), the process returns to the step S605, whereas if not (NO to the step S610), the present process is terminated.

Next, the operation of the video receiving apparatus 300 will be described.

Figure 7:
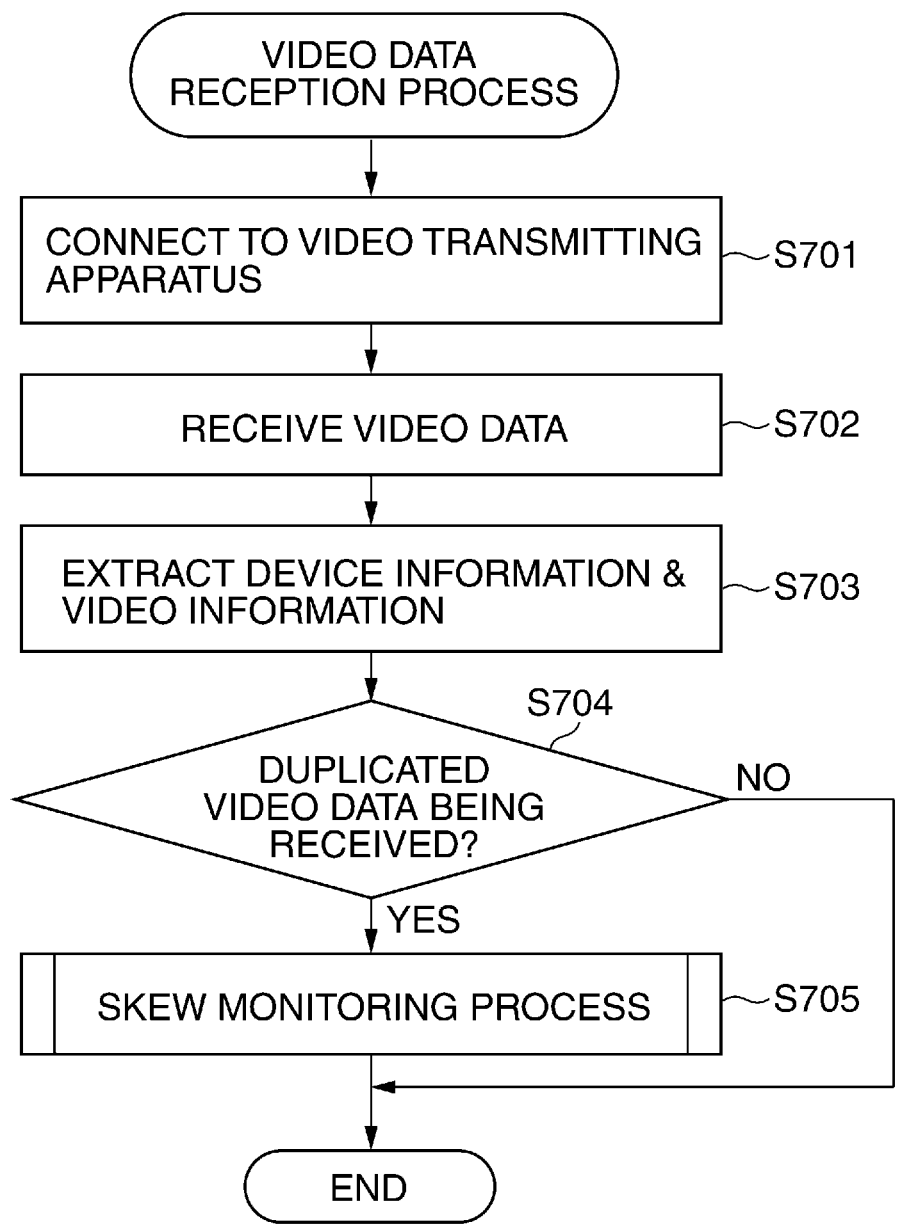
FIG. 7 is a flowchart of a video data reception process performed by the video receiving apparatus according to the first embodiment.

FIG. 7 is a flowchart of a video data reception process performed by the video receiving apparatus 300 according to the present embodiment.

Referring to FIG. 7, when the video receiving apparatus 300 is connected to the video transmitting apparatus 100 via the network (step S701), the video receiving apparatus 300 receives video data from the video transmitting apparatus 100 (step S702). More specifically, the video receiving apparatus 300 starts reception of packetized video data delivered from the video transmitting apparatus 100 via the network interface A 302, and outputs each received packet to the decoding section A 306 via the packet processor A 304. Similarly, the video receiving apparatus 300 starts reception of packetized video data delivered from the video transmitting apparatus 100 via the network interface B 303, and outputs each received packet to the decoding section B 307 via the packet processor B 305.

Next, in a step S703, the packet processor A 304 and the packet processor B 305 extract the device information and the video information (content ID) from the received packets, and output the extracted information to the network information management section 308. Here, the device information refers to the device information of the transmission source, which indicates the type of the connected apparatus and vendor information. Further, as mentioned above, the content ID is information used for determining whether or not the video data items received via the transmission path A 107 and the transmission path B 108 are of the same contents.

In a step S704, the network information management section 308 determines whether or not the duplicated video data items are being received. More specifically, the network information management section 308 refers to the device information of the transmission source and the content ID, extracted in the step S703, and determines whether or not the packetized video data items received via transmission path A 107 and the transmission path B 108 are being transmitted from the same transmission source and are of the same contents. If it is determined in the step S704 that the duplicated video data items are being received (YES to the step S704), the network information management section 308 outputs a skew monitoring start request to the skew monitoring section 309. The skew monitoring section 309 performs a skew monitoring process, described hereinafter with reference to FIG. 8, in response to the skew monitoring start request (step S705), followed by terminating the present process. If it is determined in the step S704 that the duplicated video data items are not being received (NO to the step S704), the present process is immediately terminated. Note that the skew monitoring process is continuously performed so long as packetized video data is being received. On the other hand, in a case where interruption and resumption of reception of packetized video data, switching of the video data for display on the display section 311, or disconnection and reconnection of the network, is detected, the skew monitoring section 309 starts the skew monitoring process again.

Figure 8:
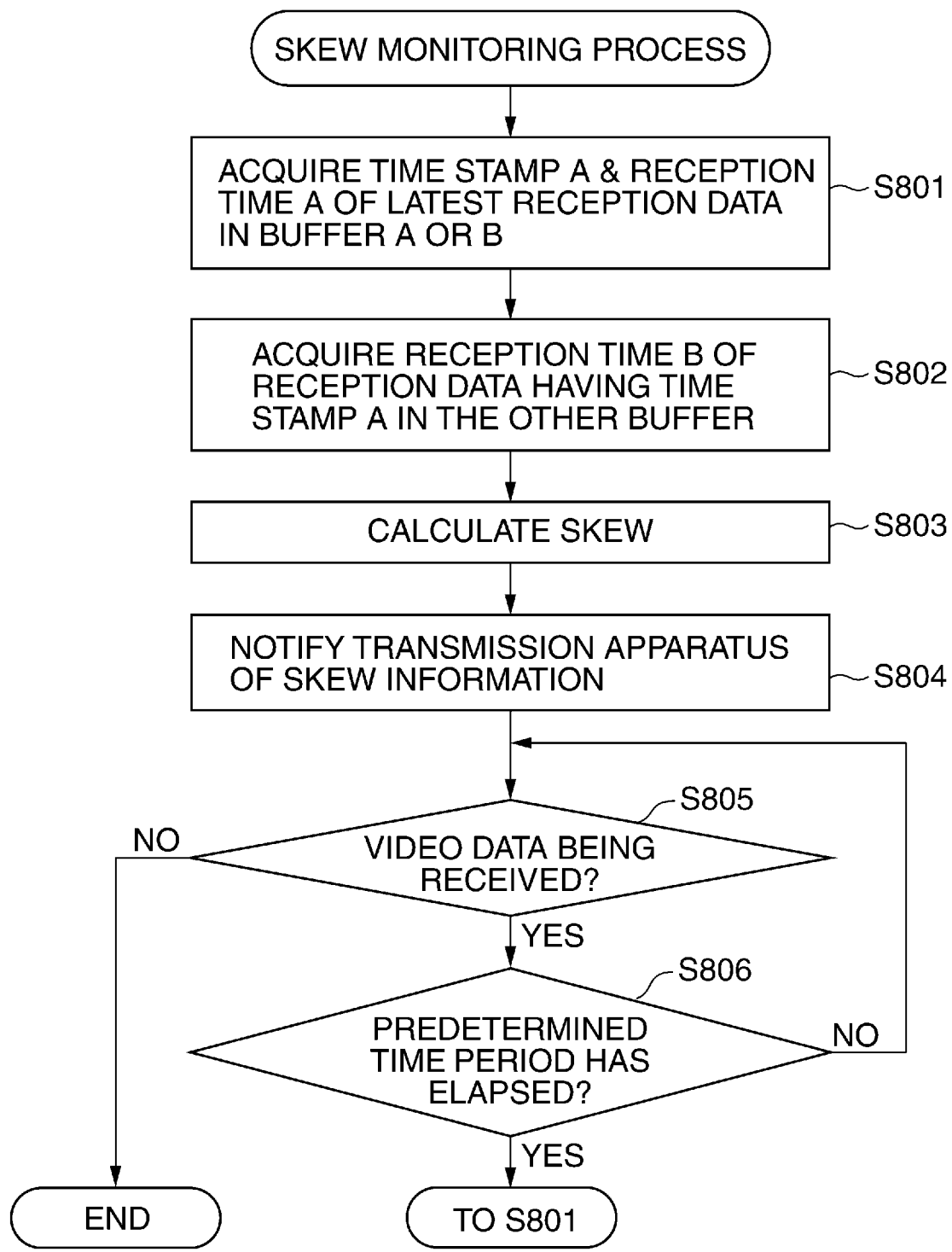
FIG. 8 is a flowchart of a skew monitoring process performed in a step in FIG. 7.

FIG. 8 is a flowchart of the skew monitoring process performed in the step S705 in FIG. 7 according to the present embodiment.

In a step S801, the skew monitoring section 309 acquires a time stamp A and a reception time A of the latest frame from the duplicated video data items accumulated in the buffer A 401 and the buffer B 402. In the following description, to simplify the explanation, it is assumed, by way of example, that the time stamp A acquired in the step S801 has been added to a frame included in the video data accumulated in the buffer A 401. In the next step S802, processing is performed with respect to one of the buffer A 401 and the buffer B 402, in which the aforementioned latest frame having the time stamp A added thereto, was not stored, i.e. the buffer B 402.

In the step S802, after the lapse of a predetermined time period, the skew monitoring section 309 searches the buffer B 402 for a frame having the time stamp A added thereto. Then, the skew monitoring section 309 acquires a reception time B of the frame found by the search.

In a step S803, using the reception time A acquired in the step S801 as a reference, the skew monitoring section 309 calculates a time difference between the reception time A and the reception time B acquired in the step S802, as a skew, and outputs the skew as skew information to the network information management section 308.

Then, in a step S804, the network information management section 308 causes the packet processor A 304 or the packet processor B 305 (the packet processor A 304 in the case of the assumed example) to form the input skew information as a monitoring result into a transmission packet. Then, the network information management section 308 notifies the video transmitting apparatus 100 of the packetized skew information via the network interface A 302 or the network interface B 303 (the network interface A 302 in the case of the assumed example).

Note that a presentation time stamp can also be added to each of the duplicated video data items, separately from the above-mentioned RTP time stamp. Similar to the RTP time stamp, the presentation time stamp is added to the same frame of the same scene of the video data items transmitted via the different transmission paths, but differs from the RTP time stamp in that it is information associated with time used for display.

In this case, the video receiving apparatus 300 can calculate a skew between the transmission paths based on a time difference in the presentation time stamp between the latest corresponding reception data items.

Next, in a step S805, the skew monitoring section 309 determines whether or not the video data is being received from the video transmitting apparatus 100. If a predetermined time period has elapsed in a state in which the video data is being received (YES to the step S805 and YES to a step S806), the skew monitoring section 309 returns to the step S801, whereas if not, the skew monitoring section 309 terminates the present process. That is, so long as the video data is being received from the video transmitting apparatus 100, a skew is periodically calculated, and the skew information is notified to the video transmitting apparatus 100. However, this is not limitative, but the process may be configured such that the video transmitting apparatus 100 inquires the video receiving apparatus 300 of the skew calculation result. Network information including values of a packet loss rate, RTT (Round Trip Time), and so forth, of the network can be similarly acquired by a conventional technique. Therefore, for example, by causing the video transmitting apparatus 100 and the video receiving apparatus 300 to bidirectionally communicate with each other only in a case where the packet loss rate is not lower than a desired value, it is possible to reduce the amount of network packets, and avoid lowering of throughput. Note that in a case where the process is configured such that the video transmitting apparatus 100 inquires the video receiving apparatus 300 of the skew calculation result, the PD specification value or a threshold value for notification control is stored in the video receiving apparatus 300 in advance, and if the skew calculation result is not smaller than the threshold value, the video receiving apparatus 300 actively notifies the video transmitting apparatus 100 of the skew calculation result.

Note that as mentioned above, in the case where interruption and resumption of reception of packetized video data, switching of video data for display on the display section 311, or disconnection and reconnection of the network, is detected, the skew monitoring section 309 starts the skew monitoring process again.

In the present embodiment, when the duplicated video data items are received via the transmission path A 107 and the transmission path B 108, the video receiving apparatus 300 uses one of the same frames having the same time stamp added thereto, which is lower in video data latency, for display output. In the case of the assumed example described above, the buffer A 401 received the frame having the time stamp A added thereto earlier than the buffer B 402, and hence the data received by the buffer A 401 is lower in latency than the data received by the buffer B 402, and is used for display output. By thus performing display output, the same frame as used for display output is received by the buffer B 402 within a predetermined skew. Therefore, even when the transmission path A 107 used for display output is down, since the corresponding frame has already been received via the transmission path B 108, it is possible to instantaneously switch the frame for display to the frame received via the transmission path B 108 which is not down.

Further, the video receiving apparatus 300 uses a transmission path which is lower in video data latency when transmitting the skew information to the video transmitting apparatus 100 in the step S804. By thus controlling data transmission, it is possible to avoid congestion of the network as much as possible, and more quickly notify the video transmitting apparatus 100 of the information from the video receiving apparatus 300, than in a case where a transmission path high in latency is used.

As described above, according to the present embodiment, the video receiving apparatus 300 acquires a time stamp added to a frame included in one of duplicated video data items, and a reception time of the frame. Then, the video receiving apparatus 300 acquires a reception time of a frame having the same time stamp added thereto which is included in the other of the duplicated video data items. Further, the video receiving apparatus 300 calculates a skew based on the two acquired reception times, and notifies the video transmitting apparatus 100 of the calculated skew. Then, the video transmitting apparatus 100 controls the encoding rate to be increased or reduced based on the notified skew. As a result, it is possible to accommodate the skew between the two transmission paths within a specification value without spoiling real-time property of video, and hence when the duplicated video data items are transmitted using two transmission paths, it is possible to ensure transmission quality when switching the video data for display from data received via one of the transmitted video data items to data received via the other.

Next, a description will be given of a second embodiment of the present invention with reference to the accompanying drawings. Note that in the second embodiment, description of the same components as those of the first embodiment is omitted as deemed appropriate.

The skew monitoring section 309 of the video receiving apparatus 300 of the present embodiment converts an amount of received data to an amount of decoded data by multiplying the amount of received data with an encoding rate. By doing this, even when data items received via the transmission path A 107 and data items received via the transmission path B 108 are different in encoding rate, it is possible to perform comparison between the amounts of received data to calculate a difference (skew).

Figure 9:
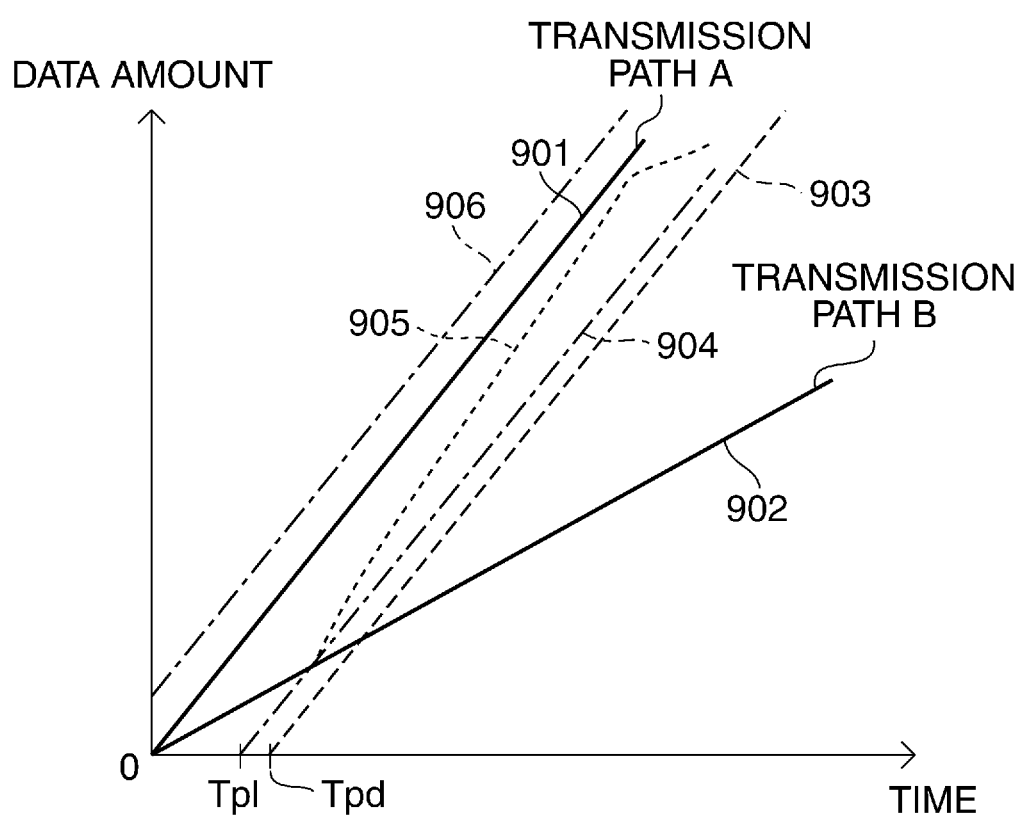
FIG. 9 is a diagram showing a relationship between a reception time and an amount of decoded data of a video receiving apparatus according to a second embodiment of the invention.

FIG. 9 is a diagram showing a relationship between a reception time and an amount of decoded data of the video receiving apparatus 300 according to the present embodiment.

Straight lines 901 and 902 in FIG. 9 represent respective amounts of data received via the transmission path A 107 and the transmission path B 108, which are used for display output by the video receiving apparatus 300.

In the present embodiment, to simplify the explanation, it is assumed, by way of example, that the transmission path A 107 is higher in throughput than the transmission path B 108. That is, when the video transmitting apparatus 100 delivers video data items by the same encoding rate, the latency of video data received by the video receiving apparatus 300 is lower when received via the transmission path A 107 than when received via the transmission path B 108.

A broken line 903 in FIG. 9 represents a relationship between time and a data amount in a case where a skew between data received via the transmission path B 108 and data received via the transmission path A 107 becomes the maximum. Assuming that a start time of data reception corresponding to the PD specification value is represented by Tpd, if data reception via the transmission path B 108 can be indicated by a broken line which is started at the start time Tpd and has the same inclination as that of the straight line 901 indicative of data reception via the transmission path A 107, it can be said that the skew (PD) between data received via the transmission path B 108 and data received via the transmission path B 108 is within the PD specification value.

In the present embodiment, the upper limit of the PD specification value for the HBR video signal is e.g. 150 [ms], and hence by setting Tpd=150 [ms], the broken line 903 in FIG. 9 can be derived. Further, the rate control threshold value PL is 110 [ms], and hence similarly, by setting Tpl=110 [ms], a dashed-dotted line 904 in FIG. 9 can be derived.

The video transmitting apparatus 100 performs video data delivery by controlling the encoding rate, in response to a request sent from the video receiving apparatus 300 as a result of execution of a skew monitoring process, described hereinafter, so as to make the amount of data received via the transmission path B 108 closer to the dashed-dotted line 904.

Figure 10:
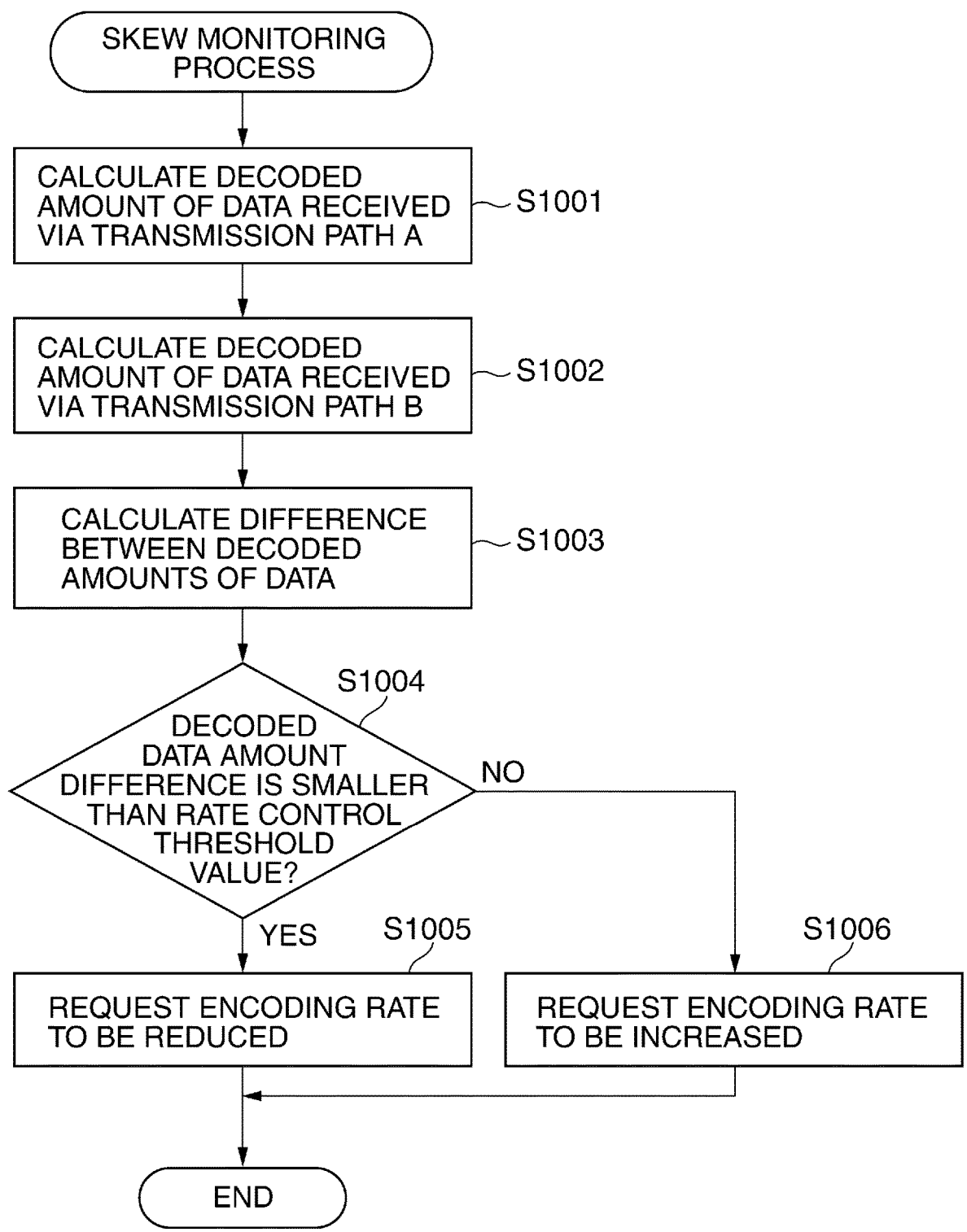
FIG. 10 is a flowchart of a skew monitoring process performed in a step in FIG. 7 by the video receiving apparatus according to the second embodiment.

FIG. 10 is a flowchart of the skew monitoring process performed by the skew monitoring section 309 of the video receiving apparatus according to the present embodiment in the step S705 in FIG. 7. The following description is given of the operation of the skew monitoring section 309 according to the present embodiment with reference to FIGS. 9 and 10.

In a step S1001, the skew monitoring section 309 of the video receiving apparatus 300 acquires an amount of reception data accumulated in the buffer A 401. At this time, the skew monitoring section 309 also acquires information on the encoding rate associated with the reception data accumulated in the buffer A 401 from the video transmitting apparatus 100. Then, the skew monitoring section 309 calculates an amount of decoded data associated with the transmission path A 107, based on the acquired amount of reception data and the information on the encoding rate.

Next, in a step S1002, the skew monitoring section 309 acquires an amount of reception data accumulated in the buffer B 402. At this time, the skew monitoring section 309 also acquires information on the encoding rate associated with the reception data accumulated in the buffer B 402 from the video transmitting apparatus 100. Then, the skew monitoring section 309 calculates an amount of decoded data associated with the transmission path B108, based on the acquired amount of reception data and the information on the encoding rate.

Note that the method of acquiring the information on the encoding rate from the video transmitting apparatus 100 by the video receiving apparatus 300 in the steps S1001 and S1002 is not particularly limited. For example, the video receiving apparatus 300 can acquire the information on the encoding rate, by using the communication control protocol described in the first embodiment, such as RTCP, or by causing the video transmitting apparatus 100 to transmit header information to which the information on the encoding rate is added (operation of a second transmission unit), as in the case of the content ID.

Next, in a step S1003, the skew monitoring section 309 calculates a difference between the amounts of decoded data which are calculated in the steps S1001 and S1002.

In a step S1004, the skew monitoring section 309 compares a result of calculation described above with the dashed-dotted line 904 in FIG. 9 which is associated with the rate control threshold value PL. As a result of this comparison, if the calculated difference in the amounts of decoded data is less than the rate control threshold PL, the process proceeds to a step S1005, wherein the skew monitoring section 309 requests the video transmitting apparatus 100 to reduce the encoding rate set for the transmission path B 108, followed by terminating the present process. Here, the request for reducing the encoding rate is transmitted in the step S1005 in the following manner: First, a transmission packet including this request is generated by each of the packet processor A 304 and the packet processor B 305. Then, the generated transmission packets are transmitted to the video transmitting apparatus 100 via the network interface A 302 and the network interface B 303, respectively.

On the other hand, if it is determined in the step S1004 that the calculated difference in the amount of decoded data is not less than the rate control threshold PL (second threshold value), the process proceeds to a step S1006. In the step S1006, a request for increasing the encoding rate is transmitted to the video transmitting apparatus 100 in a similar manner to the step S1005, followed by terminating the present process.

The video transmitting apparatus 100 delivers video data by controlling the encoding rate according to the request from the video receiving apparatus 300. For example, in a case where the request in the step S1005 is transmitted to the video transmitting apparatus 100, the amount of reception data associated with the transmission path B 108 is changed from the straight line 902 to a dotted line 905 in FIG. 9.

Although in the present embodiment, one rate control threshold PL is set to each of the transmission path A 107 and the transmission path B 108, this is not limitative. For example, by additionally setting a rate control threshold value as an upper limit which is indicated by a dashed-dotted line 906 in FIG. 9, the latency of the transmission path B 108 may be controlled to be lower than that of the transmission path A 107. By doing this, although the video image quality of data transmitted via the transmission path B 108 is lower than that of data transmitted via the transmission path A 107, even when the transmission path A 107 is temporarily down to make it impossible to receive video data, the video data for display can be switched from the data received via the transmission path A 107 to the data received via the transmission path B 108. Therefore, it is possible to avoid loss of a frame in the video data for display.

As described above, in the present embodiment, the amounts of reception data items are converted to the amounts of decoded data items, and the encoding rate is controlled according to a skew determined based on a difference in the amounts of decoded data items. As a result, it is possible to perform the encoding rate control according to the amounts of data accumulated in the buffers of the video receiving apparatus 300.

Next, a description will be given of a third embodiment of the present invention with reference to the accompanying drawings.

Note that in the present embodiment, description of the same components as those of the first or second embodiment is omitted as deemed appropriate.

In the present embodiment, a difference in image quality between video data received via the transmission path A 107 and video data received via the transmission path B 108 which are transmitted from the video transmitting apparatus 100 (hereinafter referred to as the "inter-transmission path image quality difference") is monitored. Then, in a case where the inter-transmission path image quality difference being monitored is large, a parameter used for encoding is changed and set.

In the present embodiment, when determining whether or not the inter-transmission path image quality difference is large, a ratio between the encoding rates used for compressing video data items transmitted via the transmission path A 107 and the transmission path B 108, respectively, is used. This makes it possible to transmit a video by suppressing the inter-transmission path image quality difference within a predetermined image quality difference while controlling the skew to be within a skew specification.

Figure 11:
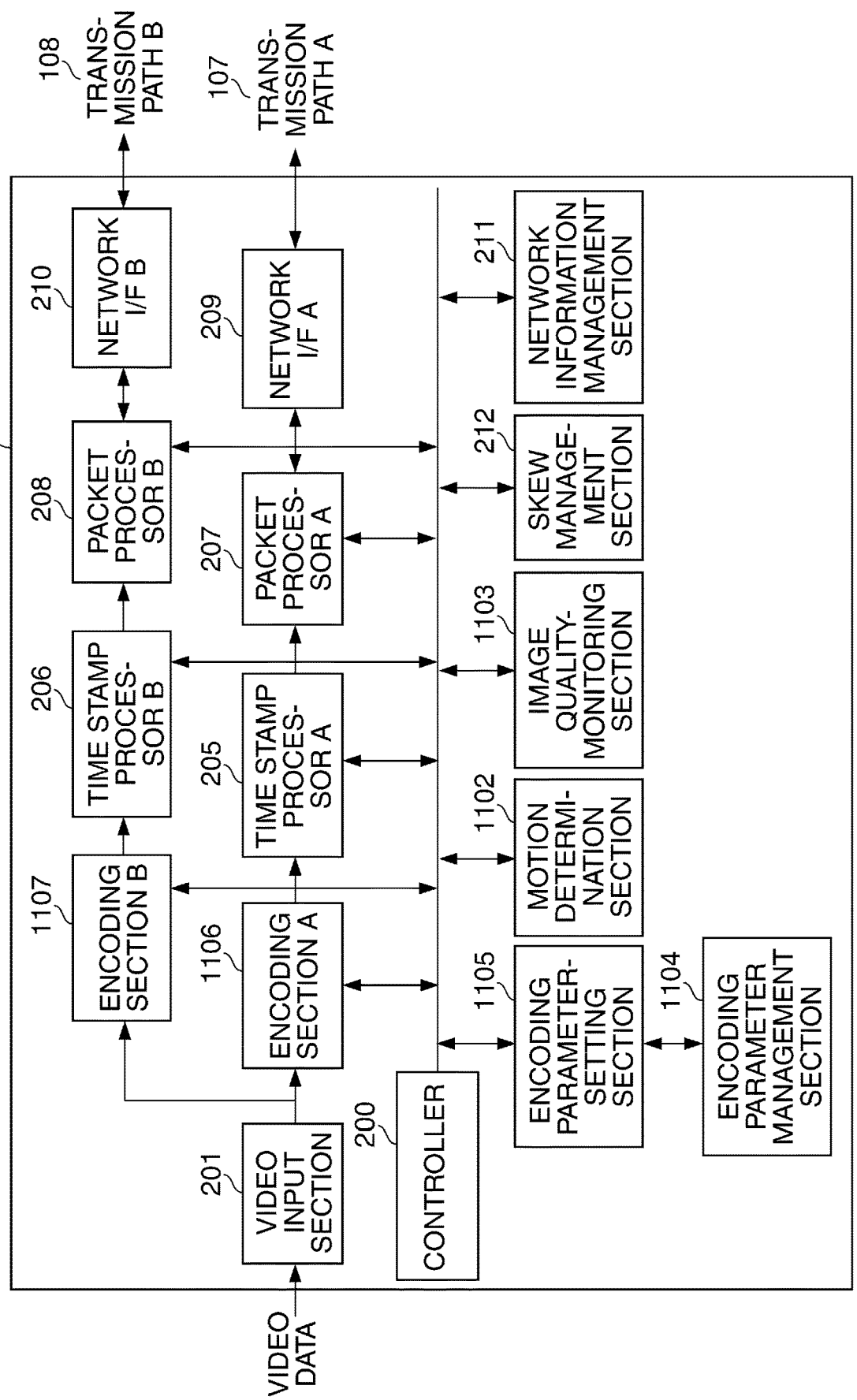
FIG. 11 is a functional block diagram of a transmission device according to a third embodiment of the invention.

FIG. 11 is a functional block diagram of a transmission device 1101 according to the present embodiment.

The transmission device 1101 differs from the transmission device 102 of the first embodiment in that a motion determination section 1102, an image quality-monitoring section 1103, an encoding parameter management section 1104, and an encoding parameter-setting section 1105 are additionally included.

The motion determination section 1102 determines an amount of motion of a video image of video data input from the video input section 201, and the image quality-monitoring section 1103 monitors the inter-transmission path image quality difference. Further, the encoding parameter management section 1104 manages parameters used for encoding processing (encoding parameters), and the encoding parameter-setting section 1105 sets encoding parameters for an encoding section A 1106 and an encoding section B 1107. The encoding parameter management section 1104 further manages the encoding parameters in the encoding processing and setting priorities when changing encoding parameters, in the form of encoding parameter tables.

FIGS. 12A and 12B are diagrams useful in explaining the encoding parameter tables held by the encoding parameter management section 1104 of the transmission device 1101 according to the present embodiment.

As shown in FIGS. 12A and 12B, the encoding parameter tables have the items of a video format, an encoding rate, a motion amount, a priority, a frame rate, and a bit depth. Under the item of the encoding rate, there are defined an initial value to be set immediately after starting transmission of a video, and the maximum value defined in advance for ensuring image quality.

Note that the maximum value of the encoding rate is defined according to a photographing genre. This is because the image quality required by a user is different depending on an type of objects to be photographed, such as portraits, sports, and scenery.

In the present embodiment, to simplify the explanation, an example of the encoding parameters for an arbitrary genre is used.

Referring to FIG. 12B, under the item of the motion amount, there is defined whether an image is large or small in the motion thereof, and under the items of the frame rate and the bit depth, there are defined values of the parameter for use in changing the format in encoding processing, in the order of priority. In FIG. 12B, under the item of priority, priority numbers are defined such that a smaller number indicates a higher priority. Further, values of the frame rate and the bit depth, each having a highest priority, are set as the initial values thereof.

The encoding parameter-setting section 1105 reads the values of the encoding rate, the frame rate, and the bit depth, as the encoding parameters, from the encoding parameter management section 1104. Then, the encoding parameter-setting section 1105 applies the values of the encoder parameters to the encoding section A 1106 and the encoding section B 1107 based on a video format acquired from the controller 200 of the transmission device 1101 and a rate changing request instructed from the image quality-monitoring section 1103.

For example, assuming that the video data has a video format of "4096×2160" and is "large" in the motion amount, the initial values of "10", "120p", and "12 bits" are applied to the encoding rate, the frame rate, and the bit depth of the video data, respectively, by consulting the encoding parameter tables shown in FIGS. 12A and 12B.

Although in the present embodiment, the motion amount is classified, based on a result of determination by the motion determination section 1102, into "large" which indicates that the amount of motion of a video image is large, and "small" which indicates that the amount of motion of a video image is small or the video image is stationary, this is not limitative. For example, by providing the video transmitting apparatus 100 with a mode for enabling a user to configure the parameters, the user may be allowed to fixedly configure the priority. By providing an interface for enabling the user to configure the parameters, it is possible to cause user's taste to be reflected on the configuration of the parameters.

Further, although in the present embodiment, the values of the frame rate and the bit depth are determined and encoded based on the video format, this is not limitative. For example, the initial values of the encoding parameters to be applied may be changed according to the frame rate and the bit depth of the video data input from the video input section 201.

The image quality-monitoring section 1103 acquires the values of the encoding parameters set for the encoding section A 1106 and the encoding section B 1107 from the encoding parameter-setting section 1105. Further, the image quality-monitoring section 1103 calculates an encoding rate ratio between the transmission path A 107 and the transmission path B 108 in a case where a value of the encoding rate included in the acquired encoding parameters is changed according to an encoding rate-changing request from the skew management section 212. Then, the image quality-monitoring section 1103 determines based on the calculated encoding rate ratio whether or not the inter-transmission path image quality difference is large.

For example, let it be assumed that when the video receiving apparatus 300 is using the transmission path A 107, which is low in latency, for display, the encoding rate value Rb set for the transmission path B 108 is incremented by 1 with respect to the encoding rate value Ra set for the transmission path A 107. In this case, the inter-transmission path image quality difference is determined using the encoding rate ratio $\Delta R=(Rb+1)/Ra$.

FIG. 13 is a diagram useful in explaining a determination threshold value table held by the image quality-monitoring section 1103 of the transmission device according to the present embodiment. This determination threshold value table is used by the image quality-monitoring section 1103 so as to determine whether or not the inter-transmission path image quality difference is within an acceptable range in a case where video data items of the same contents are redundantly transmitted over duplicate transmission paths.

If the encoding rate ratio $\Delta R$ is smaller than an associated image quality threshold value included in the determination threshold value table, the image quality-monitoring section 1103 requests the encoding parameter-setting section 1105 to change the encoding rate. On the other hand, if the encoding rate ratio $\Delta R$ is not smaller than the image quality threshold value included in the determination threshold value table, the image quality-monitoring section 1103 requests the encoding parameter-setting section 1105 to change a parameter used for encoding processing, other than the encoding rate.

Note that in FIG. 13, not one image quality threshold value, but the maximum value and the minimum value of the image quality threshold value may be set in the determination threshold value table. In this case, if the encoding rate ratio $\Delta R$ is smaller than the maximum value of the image quality threshold value included in the determination threshold value table, and is larger than the minimum value, the image quality-monitoring section 1103 requests the encoding parameter-setting section 1105 to change the encoding rate. Further, if the encoding rate ratio $\Delta R$ is not smaller than the maximum value of the image quality threshold value included in the determination threshold value table or not larger than the minimum value, the image quality-monitoring section 1103 requests the encoding parameter-setting section 1105 to change a parameter used for encoding processing, other than the encoding rate.

Figure 14A:
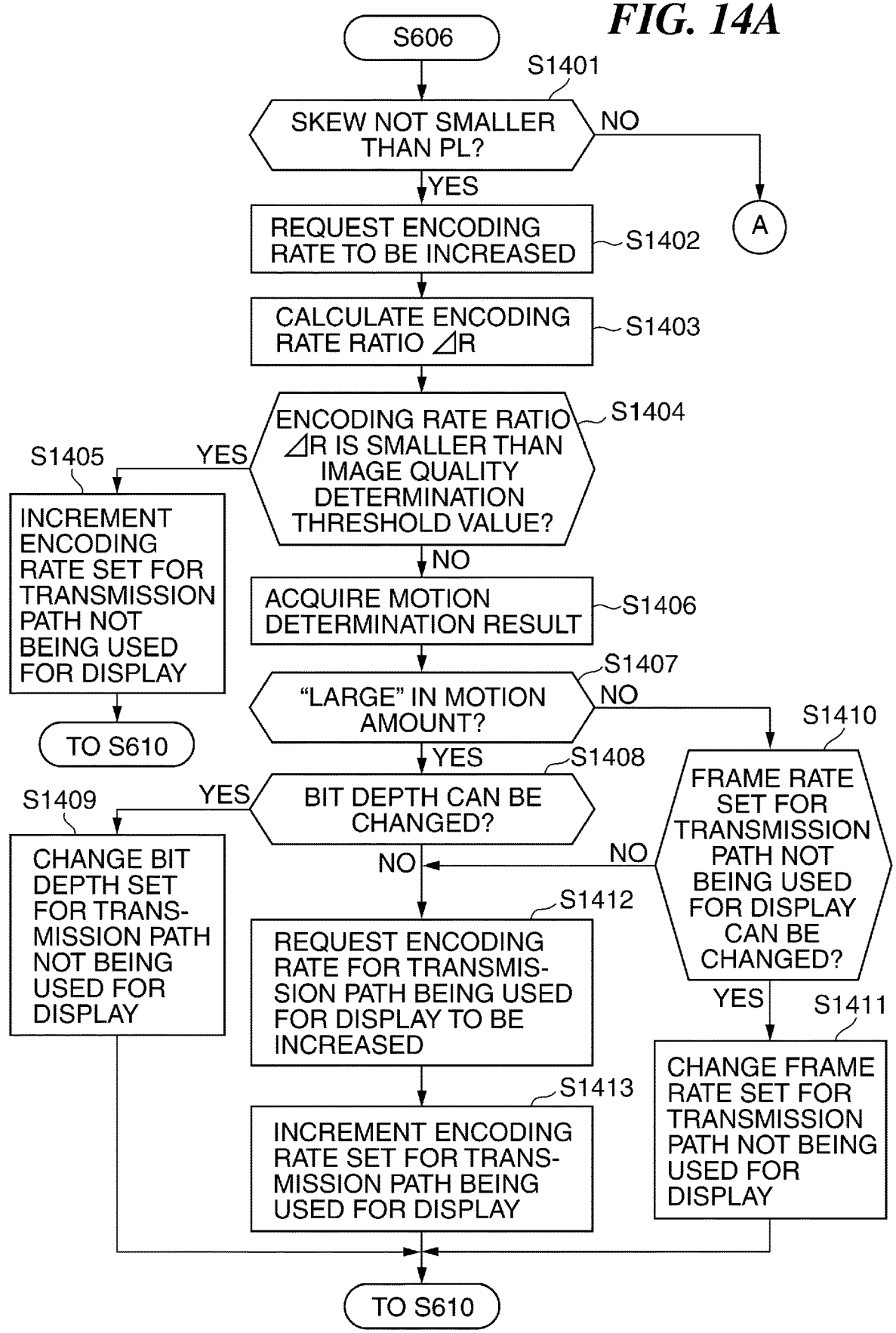
FIG. 14A is a flowchart of an encoding parameter-setting process performed by the transmission device according to the third embodiment.
Figure 14B:
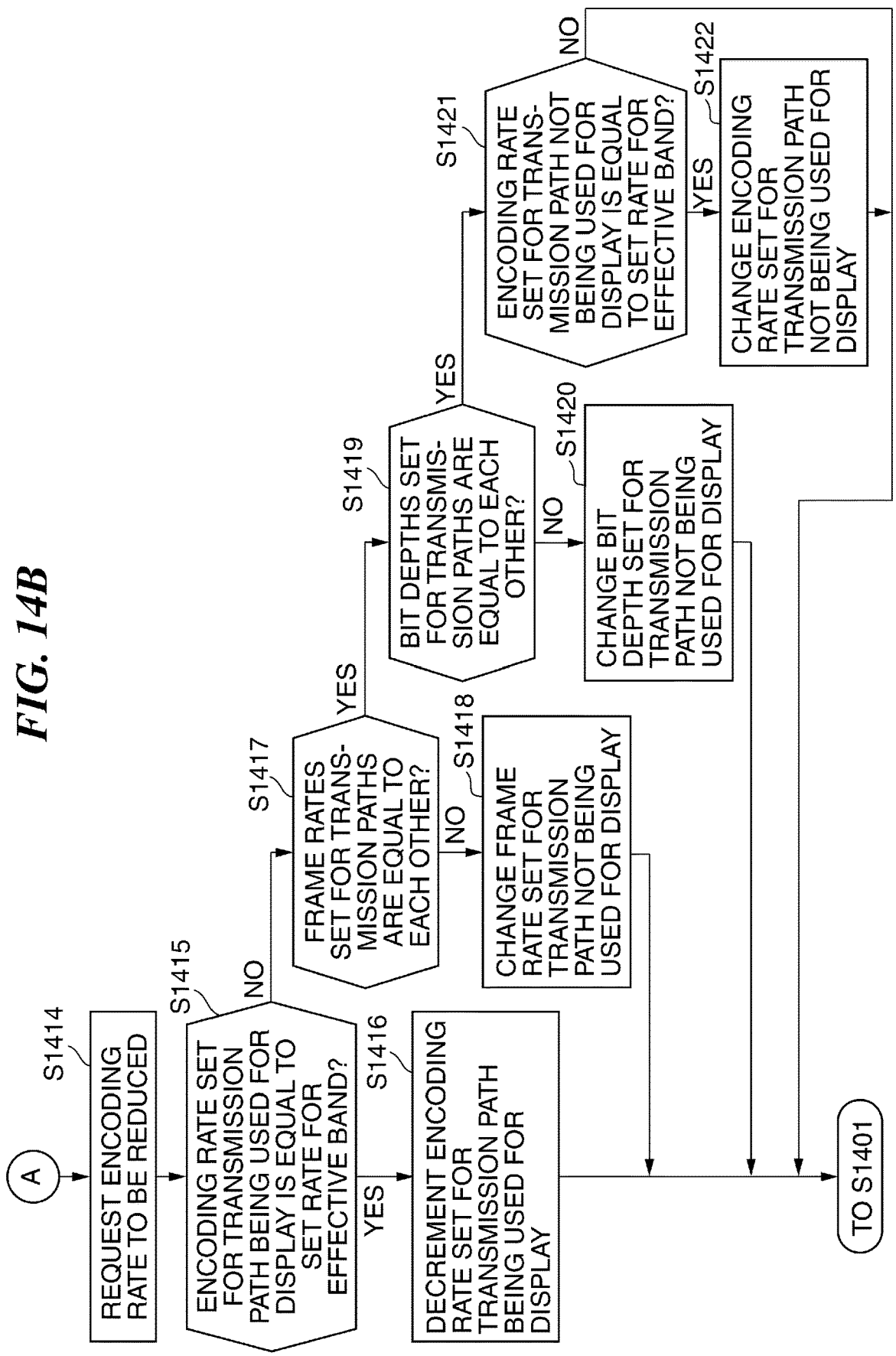
FIG. 14B is a continuation of FIG. 14A.

FIGS. 14A and 14B are a flowchart of an encoding parameter-setting process performed by the transmission device 1101 according to the present embodiment. More specifically, the present process is performed by the skew management section 212, the image quality-monitoring section 1103, and the encoding parameter-setting section 1105 of the transmission device 1101.

Note that the present process is started after execution of the steps S601 to S606 in FIG. 6.

Referring to FIG. 14A, first, in a step S1401, the skew management section 212 determines whether or not the skew is not smaller than the rate control threshold value PL 504 in FIG. 5 (this step corresponds to the step S607 in FIG. 6).

If it is determined in the step S1401 that the skew is not smaller than the rate control threshold value PL 504 (YES to the step S1401), the process proceeds to a step S1402, wherein the skew management section 212 requests the image quality-monitoring section 1103 to increase the encoding rate set for the encoding section associated with the transmission path which is later in reception time.

On the other hand, if it is determined in the step S1401 that the skew is smaller than the rate control threshold value PL 504 (NO to the step S1401), the process proceeds to a step S1414 in FIG. 14B, wherein the skew management section 212 requests the image quality-monitoring section 1103 to reduce the encoding rate set for the encoding section associated with the transmission path which is later in reception time.

In a step S1403, the image quality-monitoring section 1103 acquires the encoding parameters, which are currently set, from the encoding parameter-setting section 1105. Then, the image quality-monitoring section 1103 increments the encoding rate value of one of the transmission path A 107 and the transmission path B 108, which is not being used for display, and calculates the encoding rate ratio $\Delta R$ of the incremented encoding rate value to the encoding rate value of the transmission path which is being used for display.

Then, in a step S1404, if the encoding rate ratio $\Delta R$ is smaller than the image quality threshold value (third threshold value) included in the determination threshold value table, shown in FIG. 13, the image quality-monitoring section 1103 requests the encoding parameter-setting section 1105 to increase the encoding rate, and according to this request, the encoding parameter-setting section 1105 performs processing for incrementing the encoding rate set for the encoding section (1106 or 1107) associated with one of the transmission path A 107 and the transmission path B 108, which is not being used for display (step S1405), and then the process proceeds to the step S610 in FIG. 6.

Further, if the encoding rate ratio $\Delta R$ is not smaller than the image quality threshold value included in the determination threshold value table, shown in FIG. 13, the image quality-monitoring section 1103 requests the encoding parameter-setting section 1105 to change an encoding parameter other than the encoding rate, and proceeds to a step S1406. This makes it possible to prevent the encoding rate from being increased from the current rate and the inter-transmission path image quality difference from becoming too large.

In the step S1406, the encoding parameter-setting section 1105 acquires the motion determination result from the motion determination section 1102.

Next, if it is determined in a step S1407 that the determination result acquired from the motion determination section 1102 indicates "large" in the motion amount which means that the amount of motion of a video image is large, the encoding parameter-setting section 1105 proceeds to a step S1408. On the other hand, if it is determined that the determination result indicates "small" in the motion amount which means the amount of motion of a video image is small or the video image is stationary, the encoding parameter-setting section 1105 proceeds to a step S1410.

As the frame rate increases, the motion in the video becomes smooth, whereas as the frame rate decreases, a larger amount of data is allocated per unit time, though the smoothness of motion in the video is reduced. Therefore, in order to prioritize the smoothness for a video image which is "large" in the motion amount, the process proceeds to the step S1408, wherein it is determined whether or not it is possible to change the bit depth as an encoding parameter to a value lower in priority than the current value thereof.

If it is possible to change the bit depth as an encoding parameter to a value lower in priority than the current value thereof (YES to the step S1408), in a step S1409, the encoding parameter-setting section 1105 changes the bit depth for the video image which is "large" in the motion amount.

For example, in the case of video data which has a video format of "4096×2160" and is determined to be "large" in the motion amount, a value of "12 bits", which is a first priority, is set as an initial value of the bit depth, as mentioned above. Therefore, in the step S1409, the encoding parameter-setting section 1105 changes the bit depth to "10 bits", which is a second priority of the bit depth (see the column of the bit depth in FIG. 12B), while maintaining the frame rate of the video data transmitted via the transmission path which is not being used for display, i.e. the non-used transmission path.

In the present embodiment, the bit depth can be changed up to a third priority. Therefore, if the current bit depth is the third priority, and the bit depth cannot be changed to a value of a lower priority (NO to the step S1408), the process proceeds to a step S1412.

Although in the above description, the bit depth of the video data is controlled to be changed from 12 bits to 10 bits, the bit depth of color information may be more preferentially controlled to be changed than the bit depth of luminance, by utilizing characteristics of human recognition that human eyes less sensitively react to color changes than to luminance changes. By more preferentially reducing the transmission amount of color information than that of luminance information, it is possible to reduce the transmission amount of video data and also make the inter-transmission path image quality difference difficult to be recognized by the user in a case where the video data for display is changed by changing the transmission path.

If it is possible to change the frame rate of video data determined to be "small" in the motion amount in the step S1407, which is set for transmission via the non-used transmission path (YES to the step S1410), the process proceeds to a step S1411, wherein the encoding parameter-setting section 1105 changes the frame rate set for the non-used transmission path. For example, in the case of video data which has a video format of "4096×2160" and is determined to be "small" in the motion amount, a value of "120p", which is a first priority, is set as an initial value of the frame rate, as mentioned above. Therefore, in the step S1411, the encoding parameter-setting section 1105 changes the frame rate to "60p" which is a second priority. Further, in a case where it is further necessary to change the frame rate, the frame rate is changed to "30p", "24p", and "60i" according to the priority order.

Note that in the present embodiment, the frame rate can be changed up to a fifth priority. Therefore, if the current frame rate is the fifth priority and cannot be changed to a lower priority (NO to the step S1410), the process proceeds to the step S1412.

In the step S1412, the skew management section 212 requests the image quality-monitoring section 1103 to increase the encoding rate set for one of the transmission path A 107 and the transmission path B 108 which is being used for display out, and upon receipt of this request, the image quality-monitoring section 1103 transmits an encoding rate-changing request to the encoding parameter-setting section 1105. In a step S1413, according to this request, the encoding parameter-setting section 1105 performs processing for incrementing the encoding rate set for the encoding section (1106 or 1107) associated with the one of the transmission path A 107 and the transmission path B 108, which is being used for display.

FIG. 14B is a continuation of FIG. 14A.

Referring to FIG. 14B, first, the skew management section 212 requests the image quality-monitoring section 1103 to reduce the encoding rate (step S1414). Upon receipt of this request from the image quality-monitoring section 1103, the encoding parameter-setting section 1105 changes one of the various encoding parameters as described in the following steps.

In a step S1415, the encoding parameter-setting section 1105 determines whether or not the encoding rate set for one of the transmission path A 107 and the transmission path B 108, which is being used for display, is equal to a set rate for an effective band. In other words, it is determined whether or not the use of e.g. an incremented value of the encoding rate set in the step S1413 is being continued. Note that the effective band refers to a frequency band within which data transmission can be actually performed via a transmission path.

If the encoding rate set for the transmission path being used for display is equal to a set rate for the effective band (YES to the step S1415), the encoding parameter-setting section 1105 proceeds to a step S1416, wherein the encoding parameter-setting section 1105 performs processing for decrementing the encoding rate set for the transmission path being used for display, and returns to the step S1401.

On the other hand, if the encoding rate set for the transmission path being used for display is not equal to a set rate for the effective band (NO to the step S1415), the encoding parameter-setting section 1105 proceeds to a step S1417.

In the step S1417, the encoding parameter-setting section 1105 determines whether or not the frame rate set for the transmission path which is not being used for display is equal to the frame rate set for the transmission path being used for display, i.e. whether or not the same frame rate is set for the transmission paths.

If the same frame rate is not set for the transmission paths (NO to the step S1417), the encoding parameter-setting section 1105 proceeds to a step S1418, wherein the encoding parameter-setting section 1105 changes the frame rate set for the transmission path which is not being used for display such that it is changed toward the frame rate set for the transmission path being used for display. More specifically, the encoding parameter-setting section 1105 changes the frame rate in a direction from the fifth priority toward the first priority, shown in FIG. 12B. Then, the process returns to the step S1401.

On the other hand, if the same frame rate is set for the transmission paths (YES to the step S1417), the process proceeds to a step S1419.

In the step S1419, the encoding parameter-setting section 1105 determines whether or not the bit depth set for the transmission path which is not being used for display is equal to the bit depth set for the transmission path being used for display, i.e. whether or not the same bit depth is set for the transmission paths.

If the same bit depth is not set for the transmission paths (NO to the step S1419), the encoding parameter-setting section 1105 proceeds to a step S1420, wherein the encoding parameter-setting section 1105 changes the bit depth set for the transmission path which is not being used for display such that it is changed toward the bit rate set for the transmission path being used for display. More specifically, the encoding parameter-setting section 1105 changes the bit rate in a direction from the third priority toward the first priority, shown in FIG. 12B. Then, the process returns to the step S1401.

On the other hand, if the same bit depth is set for the transmission paths (YES to the step S1419), the process proceeds to a step S1421.

In the step S1421, the encoding parameter-setting section 1105 determines whether or not the encoding rate set for the transmission path which is not being used for display is equal to a set rate for the effective band. In other words, it is determined whether or not, the use of e.g. an incremented value of the encoding rate set in the step S1405 is being continued.

If the encoding rate set for the transmission path which is not being used for display is equal to a set rate for the effective band (YES to the step S1421), the encoding parameter-setting section 1105 proceeds to a step S1422, wherein the encoding parameter-setting section 1105 performs processing for decrementing the encoding rate set for the transmission path which is not being used for display, and returns to the step S1401.

On the other hand, if the encoding rate set for the transmission path which is not being used for display is not equal to a set rate for the effective band (NO to the step S1421), the encoding parameter-setting section 1105 returns to the step S1401.

Figure 15:
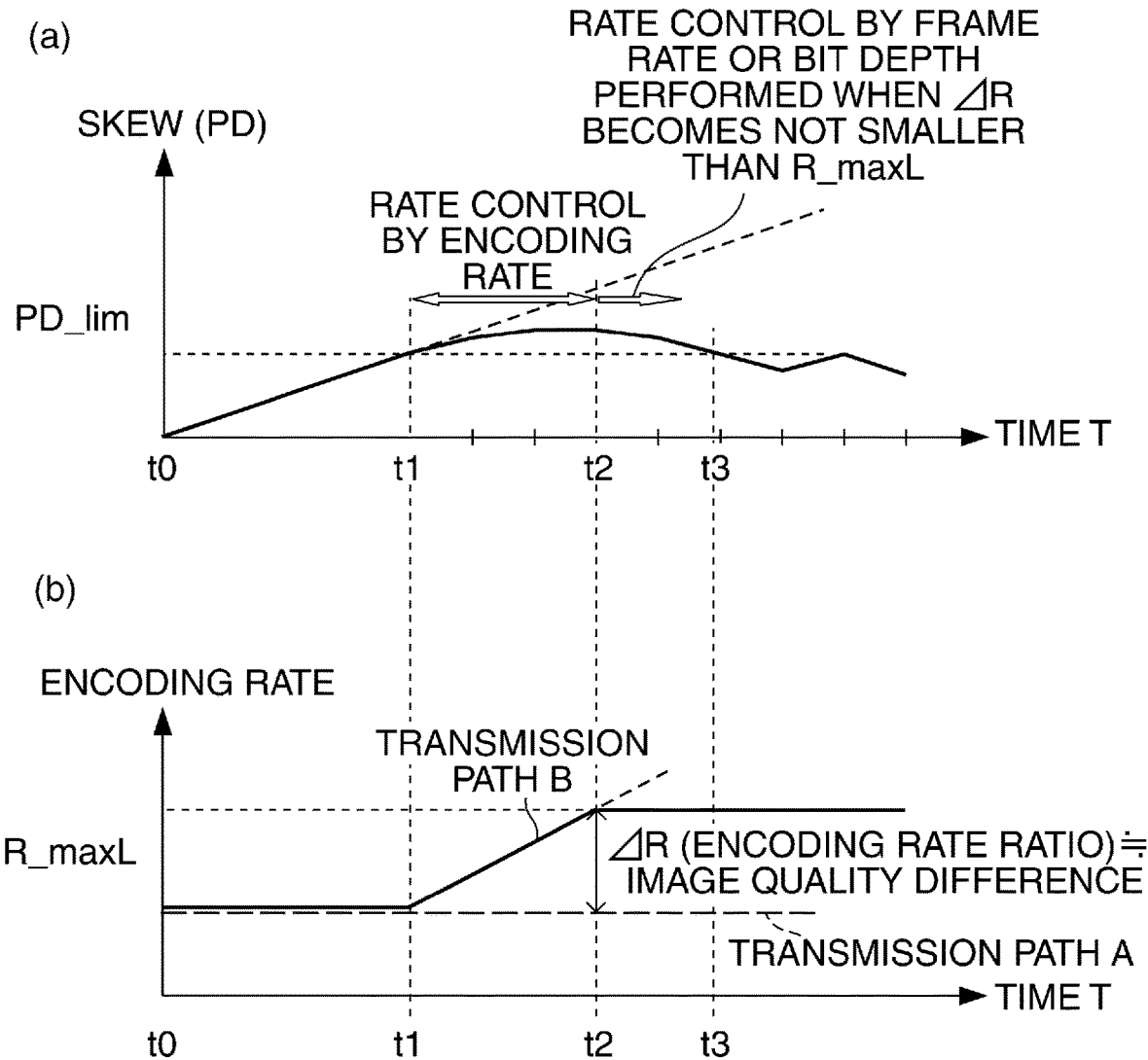
FIG. 15 is a timing diagram useful in explaining a relationship between encoding parameter control according to the third embodiment and a skew.

FIG. 15 is a timing diagram useful in explaining a relationship between the encoding parameter control of the present embodiment and a skew.

Referring to FIG. 15, (a) shows a skew between the transmission path A 107 and the transmission path B 108, occurring as time T, and (b) shows encoding rates set for the transmission path A 107 and the transmission path B 108, respectively, at the time T.

FIG. 15 shows a state in which the throughput of the transmission path B 108 is lower than that of the transmission path A 107. For example, in a case where the encoding rates set for the transmission path A 107 and the transmission path B 108 are equal to each other (a time period from time t0 to time t1), the skew (PD) between the two transmission paths increases with time.

At time t1, the skew has become not smaller than the rate control threshold PL 504 (PD_lim) in FIG. 15, and hence the encoding rate set for the transmission path B 108 is progressively increased to thereby reduce the skew between the two transmission paths (this processing corresponds to the step S1405 in FIG. 14A).

At time t2, the encoding rate ratio ΔR of the encoding rate value set for the transmission path B 108 to the encoding rate value set for the transmission path A 107 becomes not lower than the threshold value R_maxL. Therefore, the encoding parameter-setting section 1105 temporarily stops changing of the transfer rate by the encoding rate, and controls the transfer rate by the bit depth or the frame rate (this processing corresponds to the steps S1406 to S1411 in FIG. 14A). As a result, at time t3, the skew between the transmission path A 107 and the transmission path B 108 becomes not larger than the rate control threshold value PL 504 (PD_lim).

As described above, in the present embodiment, similar to the first embodiment, a skew between duplicated video data items transmitted via the two transmission paths is controlled by controlling the encoding rate. However, a difference in image quality is determined based on the encoding rate ratio between the two transmission paths, and in a case where the difference in image quality becomes not smaller than a predetermined image quality difference, an encoding parameter other than the encoding rate is changed. This provides an advantageous effect that it is possible to transmit videos having the image quality difference suppressed within a predetermined difference while holding the skew within the skew specification.

The present invention has been described heretofore based on the embodiments thereof. However, the present invention is not limited to these embodiments, but it is to be understood that the invention includes various forms within the scope of the gist of the present invention, and it is possible to combine parts of the embodiments on an as needed basis.

The embodiments have been described in detail, but the present invention can be realized by an embodiment as a system, an apparatus, a method, a program, a storage medium (recording medium), or the like. More specifically, the present invention may be applied to a system comprised of a plurality of devices, or an apparatus implemented by one device.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-149961 filed Aug. 2, 2017, which is hereby incorporated by reference herein in its entirety.

What is claimed is:

1. A transmission apparatus comprising:
at least one processor and at least one memory, the at least one memory including instructions that, when executed by the at least one processor, cause the at least one processor to operate as:
a first encoding unit configured to perform first encoding processing for generating first data based on video data;
a second encoding unit configured to perform second encoding processing for generating second data based on the video data;
a first transmission unit configured to transmit the first data to a reception apparatus via a first transmission path;
a second transmission unit configured to transmit the second data to the reception apparatus via a second transmission path;
an acquisition unit configured to acquire skew information associated with a difference between a time at which data of the first data, corresponding to a first frame, is received by the reception apparatus, and a time at which data of the second data, corresponding to the first frame, is received by the reception apparatus; and
a control unit configured to control at least one of the first encoding unit and the second encoding unit, based on the skew information, such that a difference between a time at which data of the first data, corresponding to a second frame after the first frame, is received by the reception apparatus, and a time at which data of the second data, corresponding to the second frame, is received by the reception apparatus, is not larger than a predetermined value.

2. The transmission apparatus according to claim 1, wherein the control unit controls one of the first and second encoding units which is associated with one of the first and second transmission paths which is later in the reception time, such that a data size of data generated thereby is reduced.

3. The transmission apparatus according to claim 1, wherein the control unit controls one of an encoding rate, a frame rate, and a bit depth of the video data in the first encoding processing, and an encoding rate, a frame rate, and a bit depth of the video data in the second encoding processing, based on the skew information, such that the difference between the time at which the data of the first data, corresponding to the second frame, is received by the reception apparatus, and the time at which the data of the second data, corresponding to the second frame, is received by the reception apparatus, is not larger than the predetermined value.

4. The transmission apparatus according to claim 1, wherein the first transmission unit packetizes the first data, and transmits the first data to the reception apparatus by IP network (Internet Protocol Network) transmission, and
wherein the second transmission unit packetizes the second data, and transmits the second data to the reception apparatus by IP network transmission.

5. The transmission apparatus according to claim 1, wherein the skew information is information indicative of the difference between the time at which the data of the first data, corresponding to the first frame, is received by the reception apparatus, and the time at which the data of the second data, corresponding to the first frame, is received by the reception apparatus.

6. The transmission apparatus according to claim 1, wherein the skew information is information indicative of a difference between an amount of data received by the reception apparatus via the first transmission path and an amount of data received by the reception apparatus via the second transmission path.

7. The transmission apparatus according to claim 1, wherein the predetermined value is a value determined according to a format of the video data output from the transmission apparatus.

8. The transmission apparatus according to claim 1, wherein the first encoding unit generates the first data by performing encoding processing on the video data,
wherein the second encoding unit generates the second data by performing encoding processing on the video data, and
wherein the control unit controls at least one of the first encoding unit and the second encoding unit such that a difference between an encoding rate set for the first encoding unit and an encoding rate set for the second encoding unit is not larger than a predetermined threshold value.

9. The transmission apparatus according to claim 8, wherein the control unit is capable of controlling a frame rate and a bit depth of the first data, and a frame rate and a bit depth of the second data, and
wherein the control unit controls at least one of the frame rate and the bit depth of the first data, and the frame rate and the bit depth of the second data such that the difference between the time at which the data of the first data, corresponding to the second frame after the first frame, is received by the reception apparatus, and the time at which the data of the second data, corresponding to the second frame, is received by the reception apparatus, is not larger than a first threshold value, and a difference between an encoding rate set for the first encoding unit and an encoding rate set for the second encoding unit is not larger than a second threshold value.

10. A transmission and reception system that transmits and receives data via a first transmission path and a second transmission path, including a transmission apparatus and a reception apparatus:
the transmission apparatus comprising:
at least one first processor and at least one first memory, the at least one first memory including instructions that, when executed by the at least one first processor, cause the at least one first processor to operate as:
a first encoding unit configured to perform first encoding processing for generating first data based on video data;
a second encoding unit configured to perform second encoding processing for generating second data based on the video data;

a first transmission unit configured to transmit the first data to the reception apparatus via the first transmission path;

a second transmission unit configured to transmit the second data to the reception apparatus via the second transmission path;

a first acquisition unit configured to acquire skew information associated with a difference between a time at which data of the first data, corresponding to a first frame, is received by the reception apparatus, and a time at which data of the second data, corresponding to the first frame, is received by the reception apparatus; and a control unit configured to control at least one of the first encoding unit and the second encoding unit, based on the skew information, such that a difference between a time at which data of the first data, corresponding to a second frame after the first frame, is received by the reception apparatus, and a time at which data of the second data, corresponding to the second frame, is received by the reception apparatus, is reduced, and the reception apparatus comprising:

at least one second processor and at least one second memory, the at least one second memory including instructions that, when executed by the at least one second processor, cause the at least one second processor to operate as:

a first reception unit configured to receive the first data from the transmission apparatus via the first transmission path;

a second reception unit configured to receive the second data from the transmission apparatus via the second transmission path;

a second acquisition unit configured to acquire the skew information associated with the difference between the time at which the data of the first data, corresponding to the first frame, is received by the reception apparatus, and the time at which the data of the second data, corresponding to the first frame, is received by the reception apparatus; and an output unit configured to output the skew information to the transmission apparatus.

11. A method of controlling a transmission apparatus, comprising:

performing first encoding processing for generating first data based on video data;

performing second encoding processing for generating second data based on the video data;

transmitting the first data to a reception apparatus via a first transmission path;

transmitting the second data to the reception apparatus via a second transmission path;

acquiring skew information associated with a difference between a time at which data of the first data, corresponding to a first frame, is received by the reception apparatus, and a time at which data of the second data, corresponding to the first frame, is received by the reception apparatus; and controlling at least one of the first encoding processing and the second encoding processing, based on the skew information, such that a difference between a time at which data of the first data, corresponding to a second frame after the first frame, is received by the reception apparatus, and a time at which data of the second data, corresponding to the second frame, is received by the reception apparatus, is reduced.

12. A non-transitory computer-readable storage medium storing a computer-executable program for executing a method of controlling a transmission apparatus, wherein the method comprises:

performing first encoding processing for generating first data based on video data;

performing second encoding processing for generating second data based on the video data;

transmitting the first data to a reception apparatus via a first transmission path;

transmitting the second data to the reception apparatus via a second transmission path;

acquiring skew information associated with a difference between a time at which data of the first data, corresponding to a first frame, is received by the reception apparatus, and a time at which data of the second data, corresponding to the first frame, is received by the reception apparatus; and controlling at least one of the first encoding processing and the second encoding processing, based on the skew information, such that a difference between a time at which data of the first data, corresponding to a second frame after the first frame, is received by the reception apparatus, and a time at which data of the second data, corresponding to the second frame, is received by the reception apparatus, is reduced.

* * * * *